United States Patent
Mitsuda et al.

(10) Patent No.: US 8,678,127 B2
(45) Date of Patent: Mar. 25, 2014

(54) WORK VEHICLE-MOUNTED ENGINE DEVICE

(75) Inventors: Masataka Mitsuda, Osaka (JP);
Takayuki Onodera, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 194 days.

(21) Appl. No.: 12/998,058

(22) PCT Filed: Sep. 17, 2009

(86) PCT No.: PCT/JP2009/066216
§ 371 (c)(1),
(2), (4) Date: Mar. 14, 2011

(87) PCT Pub. No.: WO2010/050314
PCT Pub. Date: May 6, 2010

(65) Prior Publication Data
US 2011/0192671 A1    Aug. 11, 2011

(30) Foreign Application Priority Data

Oct. 28, 2008 (JP) .................................. 2008-277296
Oct. 28, 2008 (JP) .................................. 2008-277297

(51) Int. Cl.
*B60K 13/04* (2006.01)
(52) U.S. Cl.
USPC ........................................ 180/309; 180/68.4
(58) Field of Classification Search
USPC ............. 180/309, 900, 68.1, 68.4, 68.6, 69.2, 180/69.24, 69.4, 69.5; 165/41, 65
See application file for complete search history.

(56) References Cited

U.S. PATENT DOCUMENTS

| 1,887,998 | A | * | 11/1932 | Fageol ...................... 123/195 A |
| 4,862,981 | A | * | 9/1989 | Fujikawa et al. ............ 180/68.4 |
| 2005/0155806 | A1 | | 7/2005 | Kanchira et al. |
| 2006/0067860 | A1 | | 3/2006 | Faircloth, Jr. et al. |
| 2010/0086446 | A1 | | 4/2010 | Matsunaga et al. |

FOREIGN PATENT DOCUMENTS

| JP | 2000-145430 | 5/2000 |
| JP | 2000-204588 | 7/2000 |

(Continued)

OTHER PUBLICATIONS

Microfilm of the specification and drawings annexed to the request of Japanese Utility Model Application No. 3536/1991 (Laid-open No. 93712/1992) (Tokyo Roki Co., Ltd.) Aug. 14, 1992, paragraph [0008]; fig. 1 JP 4-93712—Aug. 14, 1992 (Family: none) JP 4-73712 (Aug. 14, 1992).

(Continued)

*Primary Examiner* — J. Allen Shriver, II
*Assistant Examiner* — Bridget Avery
(74) *Attorney, Agent, or Firm* — Jordan and Hamburg LLP

(57) ABSTRACT

A work vehicle limited in a mounting space is adapted to have an engine, which is provided with an exhaust gas cleaning device, easily arranged therein. An engine device, which is to be mounted on the work vehicle, is provided with the engine mounted on a machine body and covered with a hood, an air cleaner for cleaning air introduced into the engine, and an exhaust gas cleaning device for cleaning exhaust gas from the engine. The exhaust gas cleaning device is arranged on a flywheel housing fitted on one side portion of the engine.

8 Claims, 24 Drawing Sheets

(56) References Cited

FOREIGN PATENT DOCUMENTS

| JP | 2001-173429 | 6/2001 |
| JP | 2003-027922 | 1/2003 |
| JP | 2003-104071 | 4/2003 |
| JP | 2004-130862 | 4/2004 |
| JP | 2005-016374 | 1/2005 |
| JP | 2005-205973 | 8/2005 |
| JP | 2007-056627 | 3/2007 |
| JP | 2007-146681 | 6/2007 |
| JP | 2008-082201 | 4/2008 |

OTHER PUBLICATIONS

Microfilm of the specification and drawings annexed to the request of Japanese Utility Model Application No. 33253/1988 (Laid-open No. 136620/1989) (Komatsu Ltd.), Sep. 19, 1989, fig. 1, 2 (Family: none)—JP 1-136620—Sep. 19, 2989.

Microfilm of the specification and drawings annexed to the request of Japanese Utility Model Application No. 130791/1989 (Laid-open No. 69058/1991) (Hitachi Construction Machinery Co., LTd.), Jul. 9, 1991, fig. 1, 2 (Family: none) JP 3-69058—Jul. 9, 1991.

* cited by examiner

WORK VEHICLE-MOUNTED ENGINE DEVICE

TECHNICAL FIELD

The present invention relates to an engine device used for a work vehicle such as a backhoe, a crane car, a fork lift, and a tractor and, more particularly, to an engine and an engine device of an exhaust gas cleaning device and the like which are arranged in a work vehicle.

BACKGROUND OF THE INVENTION

There has been known a technology in which a diesel particulate filter (or NOx catalyst) or the like is arranged as an exhaust gas cleaning device (after-treatment device) in an exhaust gas path of a diesel engine and in which exhaust gas exhausted from the diesel engine is cleaned by the diesel particulate filter (or NOx catalyst) or the like (see patent literature 1, patent literature 2, and patent literature 3). Further, there has been also known a technology in which a filter case (inner case) is fitted in a casing (outer case) and in which a particulate filter is arranged in the filter case (see patent literature 4).

CITATION LIST

Patent document 1: Japanese Patent Application Laid-open No. 2000-145430
Patent document 2: Japanese Patent Application Laid-open No. 2003-27922
Patent document 3: Japanese Patent Application Laid-open No. 2008-82201
Patent document 4: Japanese Patent Application Laid-open No. 2001-173429

SUMMARY OF THE INVENTION

In this regard, a diesel engine has broad utility and is used in various fields such as an agricultural machine, a construction machine, and a ship. A mounting space in which the diesel engine is mounted is varied in size according to a vehicle mounted with the diesel engine. However, especially in a work vehicle such as a backhoe, a turning radius is required to be made as small as possible in order to prevent the work vehicle from coming into contact with its surroundings, so that a machine body itself needs to be made compact in size and is limited (narrow) in the mounting space in many cases.

On the other hand, in the above-mentioned exhaust gas cleaning device, the temperature of the exhaust gas passing through the exhaust gas cleaning device is desired to have a high temperature (for example, 300° C. or more) from the viewpoint of function, so that there is made a request to provide the diesel engine with the exhaust gas cleaning device.

However, in order to apply a diesel engine provided with an exhaust gas cleaning device to a work vehicle (especially to a backhoe), not only the diesel engine provided with the exhaust gas cleaning device but also various kinds of parts such as an air cleaner, a radiator, and a battery need to be efficiently arranged in a narrow mounting space. Moreover, in addition to the problem that the mounting space is limited in size, there will be also presented a problem that engine vibrations caused when the engine is driven are easily transmitted directly to the exhaust gas cleaning device and a problem that when cooling air from a cooling fan provided in the diesel engine blows directly on the exhaust gas cleaning device, the temperature of the exhaust gas cleaning device, by extension, the temperature of the exhaust gas could be lowered.

Hence, the invention in the application is intended to improve a current situation like this.

To accomplish the object described above, the invention discloses a work vehicle-mounted engine device including: an engine mounted on a machine body and covered with a hood; an air cleaner for cleaning air introduced into the engine; an exhaust gas cleaning device for cleaning exhaust gas from an exhaust manifold of the engine, wherein a cooling fan is arranged on one side portion of the engine, and wherein a flywheel housing is fitted to an other side portion of the engine opposite to the one side portion where the cooling fan is arranged, a support body being fitted on an upper portion of the flywheel housing; and the exhaust gas cleaning device being fitted on the flywheel housing via the support body.

According to the invention, the exhaust gas cleaning device is arranged close to a cylinder head of the engine.

According to the invention, the air cleaner is arranged at a position lower than an upper surface of the engine and on one side of the engine; and that the exhaust gas cleaning device is arranged on an other side of the engine.

According to the invention, disclosed is a structure in which the engine and a counter weight to achieve a weight balance of a work vehicle are arranged on a turning machine body rotatable around a vertical axis and in which an exhaust gas pipe is made to communicate with the exhaust gas cleaning device; and in that an exhaust outlet side of the exhaust gas pipe is faced to a through hole formed in the counter weight.

According to the invention, disclosed is a structure in which the engine and a counter weight as a weight balancer of a work vehicle are arranged on a turning machine body rotatable around a vertical axis and in which an exhaust gas pipe is made to communicate with the exhaust gas cleaning device; and in that an exhaust port side of the exhaust gas pipe is passed through a through hole formed in the counter weight.

According to the invention, disclosed is a work vehicle structure in which a chassis for forming an engine room is fitted in the hood and in which an outer peripheral side of the engine is surrounded by the chassis for forming an engine room; and in that the air cleaner and the exhaust gas cleaning device are arranged in an engine room space surrounded by the chassis at positions separate from an upper surface of the engine.

According to the invention, disclosed is a battery for supplying electric power arranged below an engine cooling radiator and on a side of a radiator drain, the engine cooling radiator being arranged opposite to the cooling fan in the hood.

According to the invention, disclosed is a controller for controlling an operation of a turning work vehicle is arranged in the hood and above the cooling fan.

According to the invention, a cooling fan is arranged on one side portion of an engine in a hood, whereas an exhaust gas cleaning device for cleaning exhaust gas from the engine is arranged on a flywheel housing fitted to a side portion of the engine opposite to the cooling fan. That is, the exhaust gas cleaning device is arranged on the leeward side of the cooling fan across a main body of the engine. Hence, wind sent from the cooling fan and blowing directly on the exhaust gas cleaning device can be reduced, so that the temperature of the exhaust gas cleaning device can be prevented from being lowered by the wind sent from the cooling fan. Thus, the temperature of the exhaust gas can be easily kept more than a specified temperature. Moreover, the exhaust gas cleaning device can be coupled to the top of the flywheel housing of high rigidity, so that the exhaust gas cleaning device can be prevented from being damaged by vibrations or the like.

According to the invention, the exhaust gas cleaning device is arranged close to a cylinder head positioned at the upper portion of the engine. That is, the exhaust gas cleaning device is arranged on the leeward side of the cooling fan across the cylinder head. Hence, wind sent from the cooling fan and blowing directly on the exhaust gas cleaning device can be reduced by the cylinder head. Thus, the temperature of the exhaust gas can be easily kept more than a specified temperature. Moreover, the exhaust gas cleaning device can be coupled to the top of the flywheel housing of high rigidity, so that the exhaust gas cleaning device can be prevented from being damaged by vibrations or the like.

According to the invention, an air cleaner is arranged on the side of the exhaust gas cleaning device at a position lower than an upper end of the engine, so that the exhaust gas cleaning device and the air cleaner can be compactly arranged between the inner surface of the hood and the engine. The height of the upper surface of the hood with respect to the earth can be decreased as compared with a structure in which the exhaust gas cleaning device and the air cleaner are arranged on the upper surface side of the engine. Moreover, the upper surface side of the engine is arranged close to the hood and the exhaust gas cleaning device is arranged close to the air cleaner, so that the temperature of the exhaust gas cleaning device (exhaust gas in the exhaust gas cleaning device) can be kept by the exhaust heat from the engine and the exhaust gas cleaning device, and the air cleaner can be easily heated.

According to the invention, a counter weight is fitted on a side portion of a machine body and a through hole is formed in the counter weight and an exhaust outlet side of an exhaust gas pipe is faced to the through hole, so that an exhaust gas outlet side of the exhaust gas cleaning device can be made to communicate with the through hole at an extremely close range. This makes it possible to form the exhaust gas pipe in a short length and to improve the workability of a fitting work.

According to the invention, a counter weight is fitted on a side portion of the machine body and a through hole is formed in the counterweight and the exhaust outlet side of the exhaust gas pipe is passed through the through hole, so that the exhaust gas pipe can be extended on the outside of the hood at an extremely close range via the through hole. This makes it possible to form the exhaust gas pipe in a short length and to improve the workability of a fitting work.

According to the invention, a chassis for forming an engine room is fitted in the hood and an outer peripheral side of the engine is surrounded by the chassis for forming an engine room, and the air cleaner and the exhaust gas cleaning device are arranged separately from an upper surface of the engine. Hence, for example, the cylinder head, an exhaust manifold, and an intake manifold can have their upper surface sides exposed to the outside, which makes it possible to easily perform a maintenance work related to the engine. The air cleaner and the exhaust gas cleaning device can be easily protected by the chassis (such as a canopy fitting chassis and an engine support chassis) for forming an engine room.

According to the invention, a radiator for cooling an engine is arranged opposite to the cooling fan in the hood and a battery for supplying electric power is arranged below the radiator and on the side of a radiator drain, so that a space below the radiator can be effectively utilized as an arrangement space of the battery. The efficiency of utilizing an interior space of the hood can be enhanced.

According to the invention, disclosed is a controller for controlling the operation of a turning work vehicle and has the controller arranged above the cooling fan in the hood. Hence, the controller can be prevented from being heated by the exhaust heat from the exhaust gas cleaning device. The malfunction of the controller can be reduced. The durability of the controller can be improved.

DESCRIPTION OF THE PREFERRED EMBODIMENTS

Hereinafter, an embodiment to embody the present invention will be described on the basis of the drawings. Here, in the following description, an exhaust gas inflow side is simply referred to as a left side and an exhaust gas outflow side is simply referred to as a right side.

First, the general structure of an exhaust gas cleaning device will be described with reference to FIG. 1 to FIG. 9. As shown in FIG. 1 to FIG. 5, the exhausted gas cleaning device of the present invention is provided with a continuous regeneration type diesel particulate filter 1 (hereinafter referred to as "DPF"). The DPF 1 is used to physically collect particulate matter (PM) or the like in exhaust gas. The DPF 1 has a structure in which a diesel oxidation catalyst 2 such as platinum for producing nitrogen dioxide ($NO_2$) and a honeycomb structured soot filter 3 for continuously oxidizing and removing the collected particulate matter (PM) at a comparatively low temperature are arranged in series in a direction in which the exhaust gas moves (in a direction from a left side to a right side in FIG. 1). The DPF 1 is constructed in such a way that the soot filter 3 is continuously regenerated. The DPF 1 not only can remove the particulate matter (PM) in the exhaust gas but also can reduce carbon monoxide (CO) and hydrocarbon (HC) in the exhaust gas.

Figure 1:
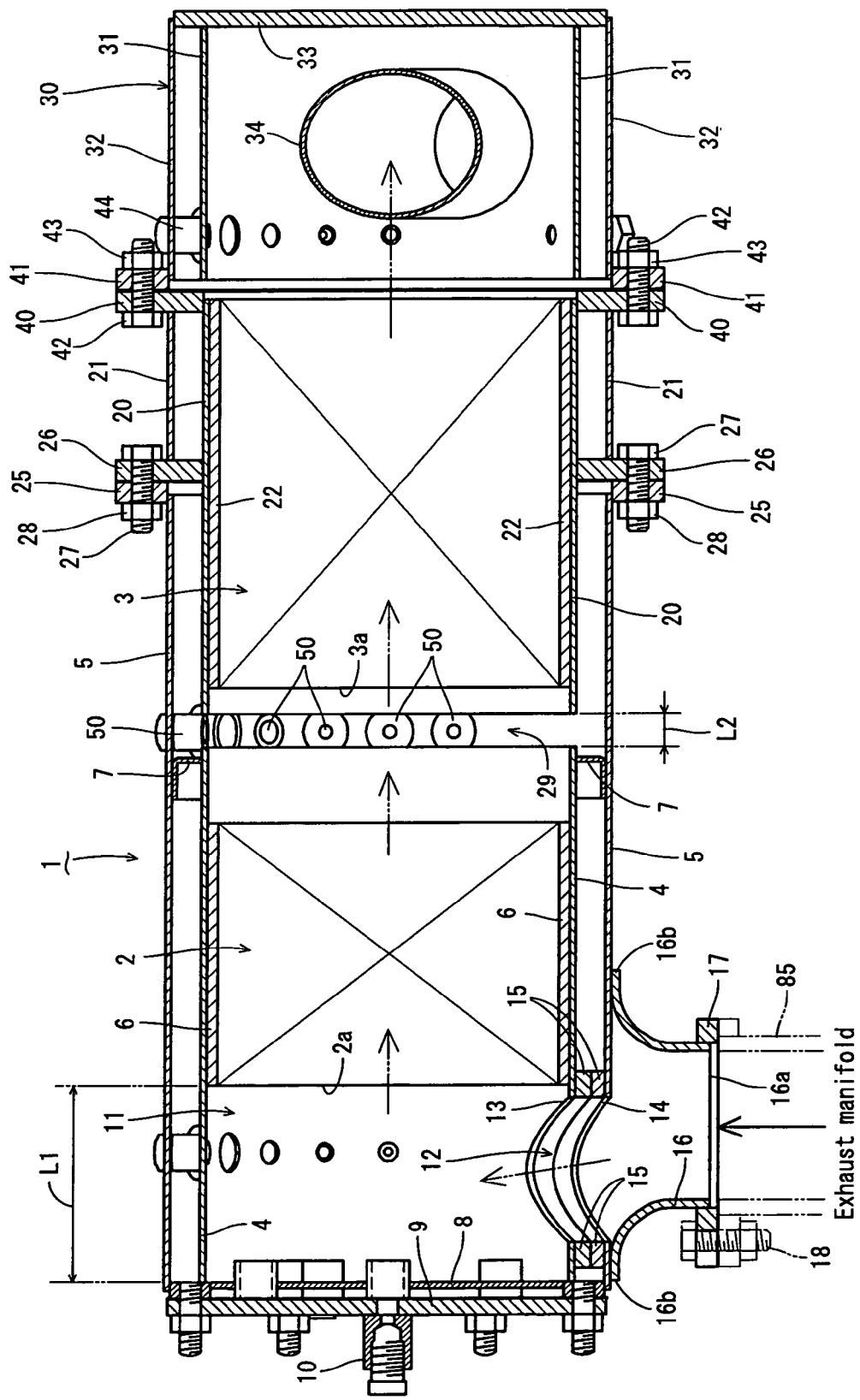
FIG. 1 is a cross-sectional view, when viewed from the front, of an exhaust gas cleaning device of an embodiment.
Figure 2:
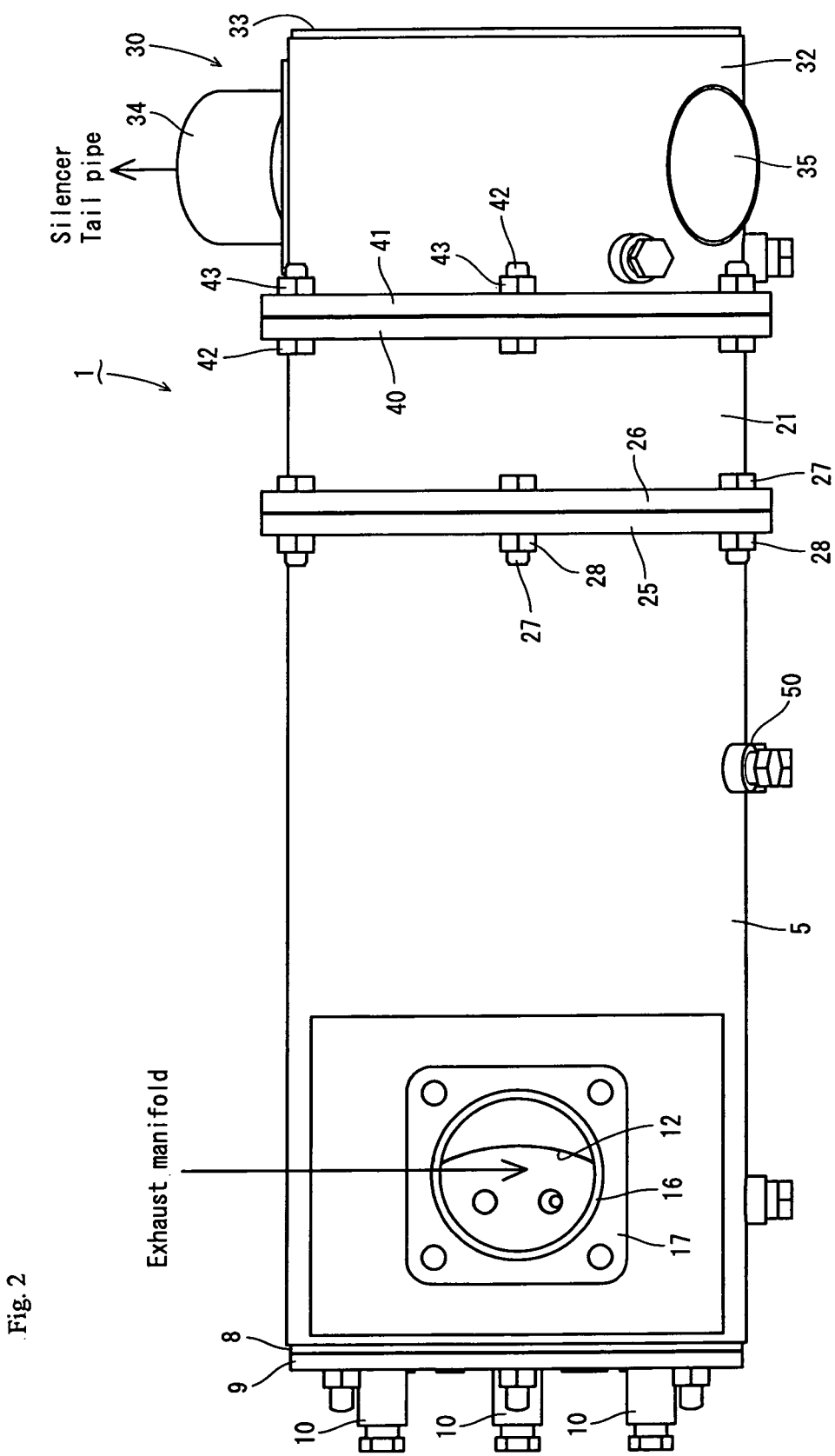
FIG. 2 is an external bottom view of the same.
Figure 3:
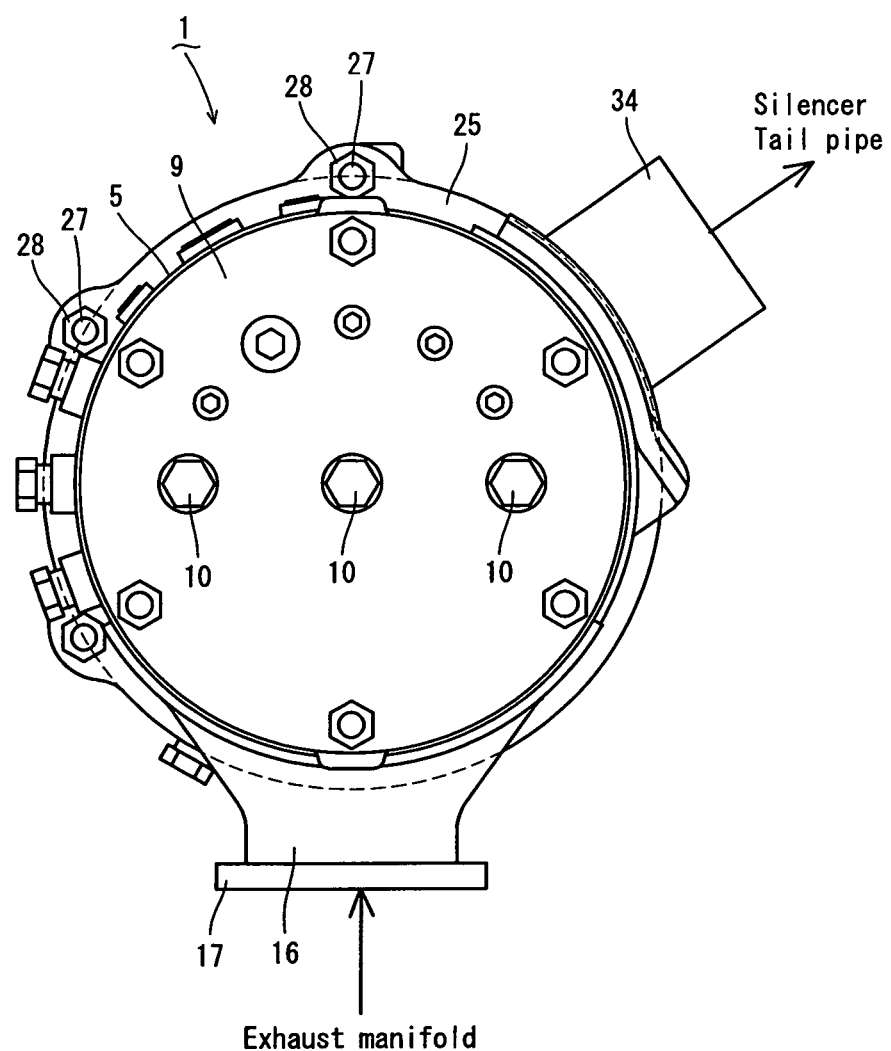
FIG. 3 is a left side view, when viewed from an exhaust gas inflow side, of the same.
Figure 4:
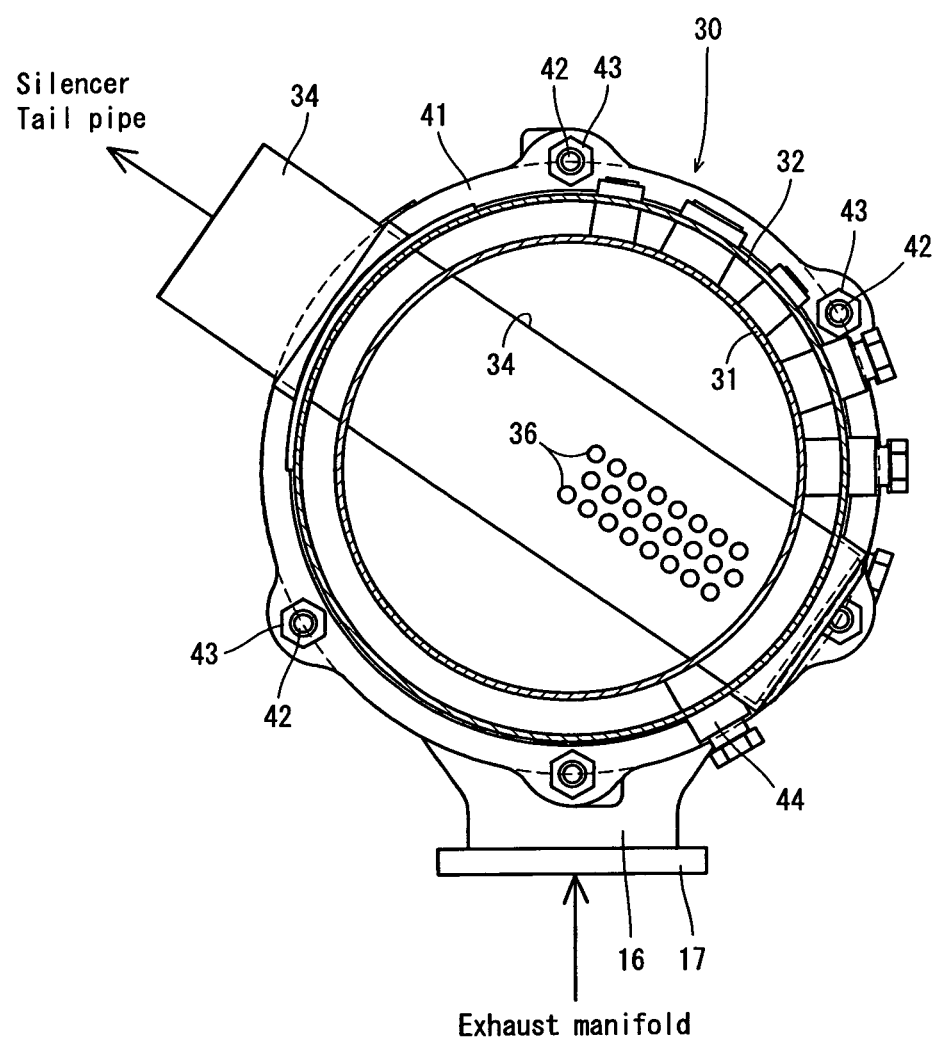
FIG. 4 is a right side cross-sectional view, when viewed from an exhaust gas outflow side, of the same.
Figure 5:
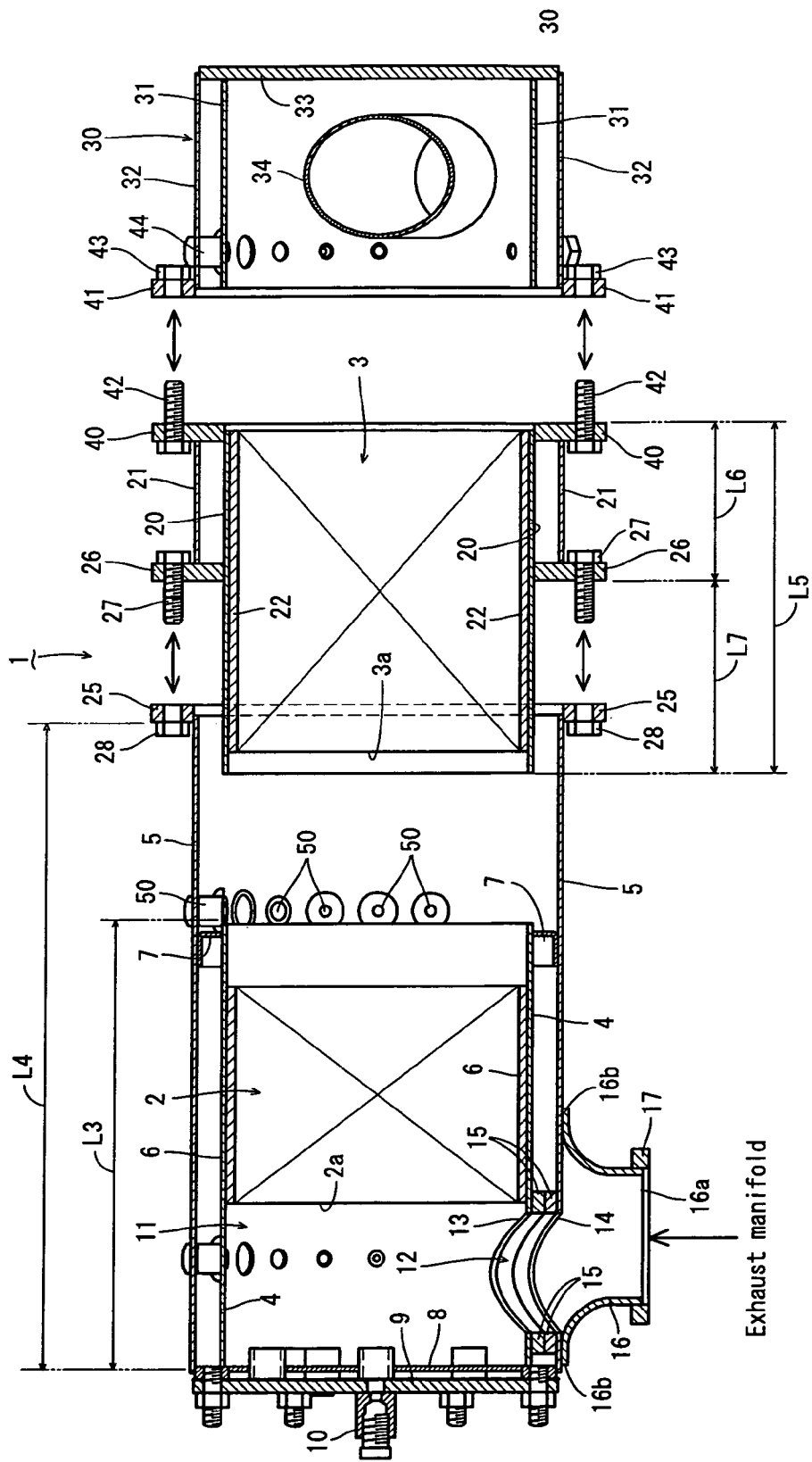
FIG. 5 is an exploded cross-sectional view, when viewed from the front, in FIG. 1.

A structure for fitting the diesel oxidation catalyst 2 will be described with reference to FIG. 1 and FIG. 5. As shown in FIG. 1 and FIG. 5, the diesel oxidation catalyst 2 as a gas cleaning filter for cleaning exhaust gas exhausted from an engine is fitted in a catalyst inner case 4 that is made of a heat resistant metal material nearly in the shape of a cylinder. The catalyst inner case 4 is fitted in a catalyst outer case 5 that is made of a heat resistant metal material nearly in the shape of a cylinder. That is, the catalyst inner case 4 is fitted onto the outside of the diesel oxidation catalyst 2 via a catalyst heat insulation material 6 made of ceramic fiber in the shape of a mat. Moreover, the catalyst outer case 5 is fitted onto the outside of the catalyst inner case 4 via a support body 7 made of a thin plate and having an end face shaped like a letter I. Here, the diesel oxidation catalyst 2 is protected by the catalyst heat insulation material 6. The stress (deforming force) transmitted to the catalyst inner case 4 from the catalyst outer case 5 is reduced by the support body 7 made of the thin plate.

As shown in FIG. 1 and FIG. 5, a circular disk-shaped left cover body 8 is firmly fixed to the left end portions of the catalyst inner case 4 and the catalyst outer case 5 by welding. A sensor connection plug 10 is firmly fixed to the left cover body 8 via a sitting plate 9. The left end face 2a of the diesel oxidation catalyst 2 and the left cover body 8 are opposed to each other separately by a specified distance L1 for a gas inflow space. An exhaust gas inflow space 11 is formed between the left end face 2a of the diesel oxidation catalyst 2 and the left cover body 8. In this regard, the sensor connection plug 10 has an inlet side exhaust gas pressure sensor and an inlet side exhaust gas temperature sensor, both of which are not shown in the drawing, connected thereto.

Figure 9:
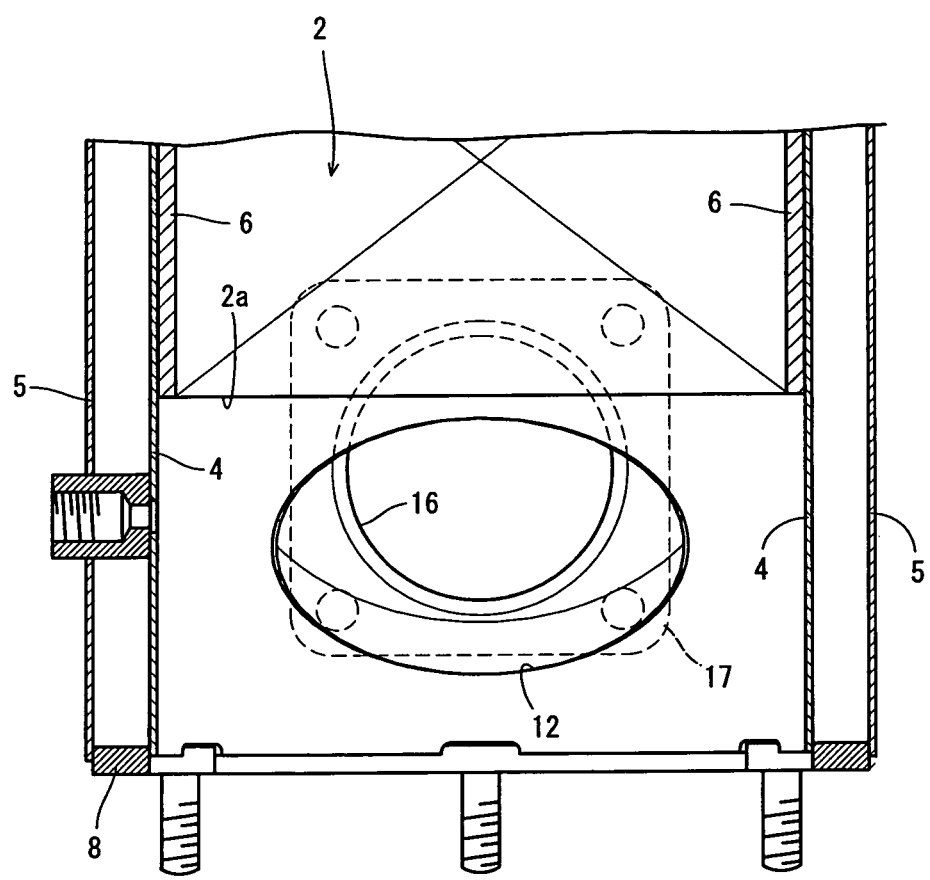
FIG. 9 is an enlarged cross-sectional view, when viewed in a plan view, of an exhaust gas inflow side of the same.

As shown in FIG. 1, FIG. 5, and FIG. 9, an ellipsoidal exhaust gas inflow port 12 is opened in the left end portions of the catalyst inner case 4, which has the exhaust gas inflow space 11 formed therein, and the catalyst outer case 5. The ellipsoidal exhaust gas inflow port 12 has a short diameter formed in a direction in which the exhaust gas moves (in the direction of a center line of the cases 4, 5) and has a long diameter formed in a direction perpendicular to the direction in which the exhaust gas moves (in the circumferential direction of the cases 4, 5). A closing ring body 15 is clamped and fixed between an opening edge 13 of the catalyst inner case 4 and an opening edge 14 of the catalyst outer case 5. A clearance between the opening edge 13 of the catalyst inner case 4 and the opening edge 14 of the catalyst outer case 5 is closed by the closing ring body 15. The closing ring body 15 prevents the exhaust gas from flowing into a clearance between the catalyst inner case 4 and the catalyst outer case 5.

As shown in FIG. 1, FIG. 3, FIG. 5, and FIG. 8, an exhaust gas inlet pipe 16 is arranged on the outside surface of the catalyst outer case 5 having the exhaust gas inflow port 12 formed therein. An open end portion 16a formed in the shape of a true circle on the small diameter side of the exhaust gas inlet pipe 16 has an exhaust connection flange body 17 welded thereto. The exhaust connection flange body 17 is fastened to an exhaust manifold 71 of a diesel engine 70, which will be described later, with a bolt 18. An open end portion 16b formed in the shape of a true circle on the large diameter side of the exhaust gas inlet pipe 16 is welded to the outside surface of the catalyst outer case 5. The exhaust gas inlet pipe 16 is formed in a shape expanding toward an end (in the shape of a bugle) from the open end portion 16a formed in the shape of a true circle on the small diameter side to the open end portion 16b formed in the shape of a true circle on the large diameter side.

Figure 8:
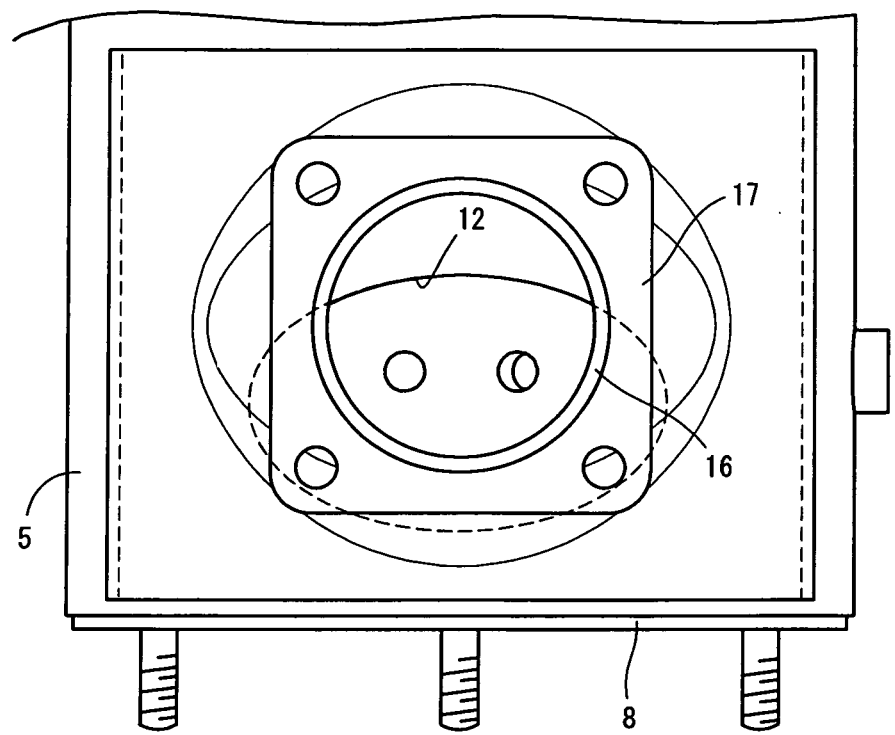
FIG. 8 is an enlarged bottom view of an exhaust gas inflow side of the same.

As shown in FIG. 1, FIG. 5, and FIG. 8, of the outside surface of the catalyst outer case 5, the outside surface of the left end portion of the opening edge 14 of the catalyst outer case 5 is welded to the left end portion of the open end portion 16b formed in the shape of a true circle on the large diameter side of the exhaust gas inlet pipe 16. That is, the exhaust gas inlet pipe 16 (open end portion 16b formed in the shape of the true circle on the large diameter side) is arranged offset on the downstream side in which the exhaust gas moves (on the right side of the catalyst outer case 5) with respect to the exhausted gas inflow part 12. That is, the ellipsoidal exhaust gas inflow port 12 is formed in the catalyst outer case 5 in such a way as to be arranged offset on the upstream side in which the exhaust gas moves (to the left side of the catalyst outer case 5) with respect to the exhaust gas inlet pipe 16 (open end portion 16b formed in the shape of the true circle on the large diameter side).

According to the above-mentioned construction, the exhaust gas from the engine 70 flows into the exhaust gas inlet pipe 16 from the exhaust manifold 71 and flows into the exhaust gas inflow space 11 through the exhaust gas inflow port 12 from the exhaust gas inlet pipe 16 and is supplied to the diesel oxidation catalyst 2 from the left end face 2a. Nitrogen dioxide ($NO_2$) is produced by the oxidation action of the diesel oxidation catalyst 2. Moreover, a support leg body 19 is welded to the outer peripheral surface of the catalyst outer case 5. When the DPF 1 is fitted to the engine 70, the catalyst outer case 5 is fixed to a flywheel housing 78 or the like of the diesel engine 70 via the support leg body 19, which will be described later in detail.

A structure of fitting the soot filter 3 will be described with reference to FIG. 1 and FIG. 5. As shown in FIG. 1 and FIG. 5, the soot filter 3 acting as a gas cleaning filter for cleaning the exhaust gas exhausted from the engine 70 is fitted in a filter inner case 20 made of a heat resistant metal material nearly in the shape of a cylinder. The filter inner case 20 is fitted in a filter outer case 21 made of a heat resistant metal material nearly in the shape of a cylinder. That is, the filter inner case 20 is fitted onto the outside of the soot filter 3 via a filter heat insulation material 22 made of ceramic fiber in the shape of a mat. In this regard, the soot filter 3 is protected by the filter heat insulation material 22.

As shown in FIG. 1 and FIG. 5, a catalyst-side flange 25 is welded to an end portion on the downstream side (right side), in which the exhaust gas moves, of the catalyst outer case 5. A filter-side flange 26 is welded to a middle portion in the direction in which the exhaust gas moves of the filter inner case 20 and to an end portion on the upstream side (left side), in which the exhaust gas moves, of the filter outer case 21. The catalyst-side flange 25 is detachably fastened to the filter-side flange 26 by bolts 27 and nuts 28. In this regard, the diameter of the cylindrical catalyst inner case 4 is nearly equal to the diameter of the cylindrical filter inner case 20. Further, the diameter of the cylindrical catalyst outer case 5 is nearly equal to the diameter of the cylindrical filter outer case 21.

As shown in FIG. 1, in the state in which the filter outer case 21 is coupled to the catalyst outer case 5 via the catalyst-side flange 25 and the filter-side flange 26, the end portion on the upstream side (left side), in which the exhaust gas moves, of the filter inner case 20 is opposed to the end portion on the downstream side (right side), in which the exhaust gas moves, of the catalyst inner case 4 in such a way as to be separated from each other by a specified gap L2 in which sensors are to be fitted. That is, a sensor fitting space 29 is formed between the end portion on the downstream side (right side), in which the exhaust gas moves, of the catalyst inner case 4 and the end portion on the upstream side (left side), in which the exhaust gas moves, of the filter inner case 20. Sensor connection plugs 50 are fixed to the catalyst outer case 5 positioned in the sensor fitting space 29. The sensor connection plugs 50 have a filter inlet-side exhaust gas pressure sensor and a filter inlet-side exhaust gas temperature sensor (thermistor), both of which are not shown in the drawing, connected thereto.

As shown in FIG. 5, a cylinder length L4 in the direction in which the exhaust gas moves of the catalyst outer case 5 is made longer than a cylinder length L3 in the direction in which the exhaust gas moves of the catalyst inner case 4. A cylinder length L6 in the direction in which the exhaust gas moves of the filter outer case 21 is made shorter than a cylinder length L5 in the direction in which the exhaust gas moves of the filter inner case 20. The sum of the lengths (L2+L3+L5) of the specified gap L2 of the sensor fitting space 29, the cylinder length L3 of the catalyst inner case 4, and the cylinder length L5 of the filter inner case 20 is made nearly equal to the sum of the lengths (L4+L6) of the cylinder length L4 of the catalyst outer case 5 and the cylinder length L6 of the filter outer case 21. The end portion on the upstream side (left side), in which the exhaust gas moves, of the filter inner case 20 is protruded from the end portion on the upstream side (left side), in which the exhaust gas moves, of the filter outer case 21 by a difference between their lengths (L7=L5−L6). That is, when the filter outer case 21 is coupled to the catalyst outer case 5, the end portion on the upstream side (left side), in which the exhaust gas moves, of the filter inner case 20 is inserted into the downstream side (right side), in which the exhaust gas moves, of the catalyst outer case 5 by an overlap length L7.

According to the above mentioned construction, the nitrogen dioxide (NO$_2$) produced by the oxidation action of the diesel oxidation catalyst 2 is supplied to the soot filter 3 from the left end face 3a of the soot filter 3. The collected particulate matter (PM) in the exhaust gas from the diesel engine 70 collected by the soot filter 3 is continuously oxidized and removed by nitrogen dioxide (NO$_2$) at a comparatively low temperature. Not only the particulate matter (PM) in the exhaust gas from the engine 70 collected by the soot filter 3 is removed, but also carbon monoxide (CO) and hydrocarbon (HC) in the exhaust gas from the engine 70 is reduced.

As shown in FIG. 1 to FIG. 5, in the exhaust gas cleaning device including the diesel oxidation catalyst 2 and the soot filter 3 as the gas cleaning filter for cleaning the exhaust gas exhausted from the diesel engine 70, the catalyst inner case 4 and the filter inner case 20 which have the diesel oxidation catalyst 2 and the soot filter 3 fitted therein respectively, and the catalyst outer case 5 and the filter outer case 21 which have the catalyst inner case 4 and the filter inner case 20 fitted therein respectively, the present embodiment is provided with a plurality of sets of diesel oxidation catalyst 2 and soot filter 3, catalyst inner case 4 and filter inner case 20, and catalyst outer case 5 and filter outer case 21 and is constructed in such a way that a catalyst-side flange 25 and a filter-side flange 26, both of which act as flange bodies for coupling the catalyst outer case 5 and the filter outer case 21, are arranged offset with respect to a connection boundary position of the diesel oxidation catalyst 2 and the soot filter 3. Hence, when a spacing between a junction portion of the diesel oxidation catalyst 2 and a junction portion of the soot filter 3 is shortened, the coupling length of the catalyst outer case 5 and the filter outer case 21 can be shortened. Moreover, a gas sensor and the like can be easily arranged at the connection boundary position of the diesel oxidation catalyst 2 and the soot filter 3. The lengths in the direction in which the exhaust gas moves of the catalyst outer case 5 and the filter outer case 21 can be shortened, so that the catalyst outer case 5 and the filter outer case 21 and the like can be increased in rigidity and decreased in weight.

As shown in FIG. 1 to FIG. 5, the present embodiment is structured by two kinds of diesel oxidation catalyst 2 and soot filter 3 and is constructed in such a way that the filter inner case 20 having one the one soot filter 3 fitted therein is overlapped by the catalyst outer case 5 having the catalyst inner case 4 of the other diesel oxidation catalyst 2, so that while the length in the direction in which the exhaust gas moves of the diesel oxidation catalyst 2 and the soot filter 3 is ensured, the length in the direction in which the exhaust gas moves of the catalyst outer case 5 and the filter outer case 21 can be shortened. Further, when the catalyst outer case 5 and the filter outer case 21 are separated (disassembled) from each other, the catalyst inner case 4 (the other diesel oxidation catalyst 2) overlapped by the catalyst outer case 5 is greatly exposed to the outside, so that the exposed range in which the catalyst inner case 4 (the other diesel oxidation catalyst 2) is enlarged, which makes it possible to easily perform a maintenance work of removing soot on the one soot filter 3 and the other maintenance works.

As shown in FIG. 1 to FIG. 5, the present embodiment is provided with the diesel oxidation catalyst 2 and the soot filter 3 as a plurality of gas cleaning filters and is constructed in such a way that the catalyst-side flange 25 and the filter-side flange 26 are arranged offset on the outer peripheral side of the soot filter 3. Hence, when the catalyst outer case 5 and the filter outer case 21 are separated from each other, the end portion of the filter inner case 20 on the exhaust gas inlet side of the soot filter 3 can be greatly exposed from the end face of the filter outer case 21, which makes it possible to easily perform the maintenance work of removing soot deposited on the soot filter 3 and the filter inner case 20.

As shown in FIG. 1 to FIG. 5, the present embodiment is structured by two kinds of diesel oxidation catalyst 2 and soot filter 3 and has the sensor fitting space 29 formed between the catalyst inner case 4 having the one diesel oxidation catalyst 2 fitted therein and the filter inner case 20 having the other soot filter 3 fitted therein. Hence, while the coupling length in the direction in which the exhaust gas moves of the catalyst outer case 5 and the filter outer case 21 is shortened to increase the rigidity of the catalyst outer case 5 and the filter outer case 21 and the like and to decrease the weight of the same, the gas sensor or the like can be arranged in the sensor fitting space 29 at the connection boundary position of the diesel oxidation catalyst 2 and the soot filter 3.

As shown in FIG. 1 to FIG. 5, the present embodiment is constructed in such a way that the sensor connection plugs 50 as the sensor support bodies are fitted on the catalyst outer case 5 overlapping the filter inner case 20 and that gas sensors such as a filter inlet-side exhaust gas pressure sensor and a filter inlet-side exhaust gas temperature sensor (thermistor), both of which are not shown in the drawing, are arranged at the connection boundary position of the diesel oxidation catalyst 2 and the soot filter 3 via the sensor connection plugs 50.

Hence, while the catalyst outer case 5 and the filter outer case 21 and the like are increased in rigidity and decreased in weight, the sensor connection plugs 50 can be arranged at the connection boundary position of the diesel oxidation catalyst 2 and the soot filter 3.

As shown in FIG. 1 to FIG. 5 and FIG. 8, in the exhaust gas cleaning device provided with the diesel oxidation catalyst 2 or the soot filter 3 as the gas cleaning filter for cleaning the exhaust gas exhausted from the diesel engine 70, the catalyst inner case 4 or the filter inner case 20 as the inner case having the diesel oxidation catalyst 2 or the soot filter 3 fitted therein, and the catalyst outer case 5 or the filter outer case 21 as the outer case having the catalyst inner case 4 or the filter inner case 20 fitted therein, the exhaust gas inflow port 12 is formed in the peripheral surfaces on the one end sides of the catalyst inner case 4 and the catalyst outer case 5 and the exhaust gas inlet pipe 16 is arranged outside the exhaust gas inflow port 12 of the outer periphery of the catalyst outer case 5 and the area of the opening end face on the exhaust gas outlet side of the exhaust gas inlet pipe 16 is made larger than the area of the opening end face on the exhaust gas inlet side of the exhaust gas inlet pipe 16.

Hence, the exhaust gas inlet pipe can be arranged closer to a portion in which the diesel oxidation catalyst 2 is fitted, so that the length in the direction in which the exhaust gas moves of the catalyst outer case 5 (casing) on the upstream side of the exhaust gas from the diesel oxidation catalyst 2 can be easily shortened. That is, the end face of the diesel oxidation catalyst 2 can be easily arranged closer to the end face on the upstream side in the direction in which the exhaust gas moves of the catalyst outer case 5. Moreover, by making the area of the opening end face on the exhaust gas outlet side of the exhaust gas inlet pipe 16 larger than the area of the opening end face on the exhaust gas inlet side of the exhaust gas inlet pipe 16, the exhaust gas inlet pipe 16 can be welded to the outer peripheral surface of the catalyst outer case 5. Hence, without providing a reinforcing member, which is used in the related art, for coupling the catalyst outer case 5 to the exhaust gas inlet side pipe 16, the fitting strength of the exhaust gas inlet pipe 16 on the exhaust gas inlet side of the catalyst outer case 5 can be held and the exhaust pressure loss of the exhaust gas at the catalyst outer case 5 and the exhaust gas inlet pipe 16 can be decreased.

As shown in FIG. 1, FIG. 2, FIG. 5, and FIG. 8, the present embodiment is constructed in such a way that the end edge on the exhaust gas outlet side of the exhaust gas inlet pipe 16 is fixed to the outer peripheral surface of the exhaust gas inlet of the catalyst outer case 5 and that the exhaust gas inlet pipe 16 is arranged offset on the downstream side of the exhaust gas from the catalyst outer case 5 with respect to the exhaust gas inlet port 12 of the catalyst outer case 5. Hence, the end face on the upstream side of the exhaust gas from the diesel oxidation catalyst 2 can be arranged closer to the upstream side of the exhaust gas than the opening edge on the exhaust gas downstream side of the exhaust gas from the exhaust gas inlet pipe 16, so that of the length in the direction in which the exhaust gas moves of the catalyst outer case 5, the length on the upstream side of the exhaust gas can be easily shortened. That is, the catalyst outer case 5 can be made compact in the length in the direction in which the exhaust gas moves. That is, the exhaust gas outlet side of the exhaust gas inlet pipe 16 can be arranged separately from the side end face on the upstream side in the direction in which the exhaust gas moves of the catalyst outer case 5. The present embodiment can be shortened in the dimension in the direction in which the exhaust gas moves of the catalyst outer case 5, so that the present embodiment can be constructed of a smaller number of parts, at lower cost, more compactly, and in lighter weight than ever.

As shown in FIG. 1, FIG. 2, FIG. 5, and FIG. 8, in the direction in which the exhaust gas moves of the catalyst outer case 5, the opening on the exhaust gas outlet side of the exhaust gas inlet pipe 16 is made larger in size than the opening of the exhaust gas inflow port 12 of the catalyst outer case 5 and the catalyst inner case 4. Hence, without a reinforcing member used in the related art, the fitting strength of the exhaust gas inlet pipe 16 on the exhaust gas inlet side of the catalyst outer case 5 can be held and the exhaust pressure loss of the exhaust gas inlet pipe 16 and the exhaust gas inflow port 12 of the catalyst outer case 5 can be decreased. As compared with a structure having a reinforcing member in the related art, the present embodiment can be constructed of a smaller number of constituent parts at lower cost. The catalyst outer case 5 can be made compact in the outer shape and can be easily decreased in the weight, whereas the exhaust gas inlet side of the catalyst outer case 5 and the exhaust gas inlet pipe 16 can be made highly rigid. That is, the exhaust gas inlet of the catalyst outer case 5 and the catalyst inner case 4 can be formed close to the side end face on the upstream side in the direction in which the exhaust gas moves of the catalyst outer case 5. The present embodiment can be shortened in the dimension in the direction in which the exhaust gas moves of the catalyst outer case 5, so that the present embodiment can be constructed of a smaller number of parts, at lower cost, more compactly, in lighter weight than ever.

As shown in FIG. 1, FIG. 2, FIG. 5, and FIG. 8, the present embodiment is constructed in such a way that the end face on the upstream side in the direction in which the exhaust gas moves of the diesel oxidation catalyst 2 or the soot filter 3 is arranged closer to the upstream side in the direction in which the exhaust gas move of the catalyst outer case 5 than the end portion on the downstream side in the direction in which the exhaust gas moves on the exhaust gas outlet side of the exhaust gas inlet pipe 16. Hence, of the length in the direction in which the exhaust gas moves of the catalyst outer case 5, the length on the upstream side of the exhaust gas can be easily shortened, and hence the catalyst outer case 5 can be made compact in the length in the direction in which the exhaust gas moves.

As shown in FIG. 1, FIG. 2, FIG. 5, and FIG. 8, the present embodiment is constructed in such a way that of the opening edge of the exhaust gas inflow port 12 of the catalyst outer case 5, the end portion on the exhaust gas outlet side of the exhaust gas inlet pipe 16 is coupled to the opening edge of the exhaust gas inflow port 12 on the upstream side in the direction in which the exhaust gas moves. Hence, of the length in the direction in which the exhaust gas moves of the catalyst outer case 5, the length on the upstream side of the exhaust gas can be easily shortened, whereas the exhaust pressure loss of the exhaust gas in the catalyst outer case 5 and the exhaust gas inlet pipe 16 can be reduced.

In this regard, as described above, the present embodiment is provided with the diesel oxidation catalyst 2 and the soot filter 3 as the gas cleaning filter for cleaning exhaust gas exhausted from the engine. However, in place of the diesel oxidation catalyst 2 and the soot filter 3, the present embodiment may be provided with a NOx selectively reducing catalyst (NOx removing catalyst) for reducing nitrogen oxide (NOx) in the exhaust gas from the engine 70 by ammonia ($NH_3$) produced by adding urea (reducing agent) and an ammonia removing catalyst for removing remaining ammonia emitted from the NOx selectively reducing catalyst.

As described above, when the catalyst inner case 4 is provided with the NOx selectively reducing catalyst (NOx removing catalyst) as the gas cleaning filter and the filter inner case 20 is provided with the ammonia removing catalyst, nitrogen oxide (NOx) in the exhaust gas exhausted from the engine 70 can be reduced and emitted as harmless nitrogen gas ($N_2$).

As shown in FIG. 1 to FIG. 5, in the exhaust gas cleaning device provided with the diesel oxidation catalyst 2 and the soot filter 3 as the gas cleaning filter for cleaning the exhaust gas exhausted from the diesel engine 70, the catalyst inner case 4 and the filter inner case 20 having the diesel oxidation catalyst 2 and the soot filter 3 fitted therein respectively, and the catalyst outer case 5 and the filter outer case 21 having the catalyst inner case 4 and the filter inner case 20 fitted therein respectively, the catalyst inner case 4 and the filter inner case 20 are coupled to the catalyst outer case 5 and the filter outer case 21, respectively, and the exhaust gas inlet pipe 16 as an inlet constituent part having an external force applied thereto and the support leg body 19 as the support body are arranged on the catalyst outer case 5.

Hence, the external stress can be supported by the catalyst outer case 5 and hence the external stress applied to the catalyst inner case 4 and the filter inner case 20 as a deforming force can be reduced. The double structure of the catalyst inner case 4 and the filter inner case 20 and the catalyst outer case 5 and the filter outer case 21 not only can enhance the heat insulation of the diesel oxidation catalyst 2 and the soot filter 3 and the processing capacity and the regeneration capacity of the diesel oxidation catalyst 2 and the soot filter 3, but also can easily prevent the diesel oxidation catalyst 2 and the soot filter 3 from being improperly supported, for example, by the transmission of vibrations from the engine 70 and the strain caused by welding.

As shown in FIG. 1 to FIG. 5, the present embodiment is provided with the plurality of sets of diesel oxidation catalyst 2 and soot filter 3, catalyst inner case 4 and filter inner case 20, and catalyst outer case 5 and filter outer case 21 and has the plurality of sets of catalyst outer case 5 and filter outer case 21 coupled to each other by the catalyst-side flange 25 and filter-side flange 26 as the flange bodies. Hence, the plurality of sets of catalyst inner case 4 and filter inner case 20 and the plurality of sets of catalyst outer case 5 and filter outer case 21 can be functionally constructed in consideration of the construction of the exhaust gas inlet pipe 16 and the support leg body 19 and the movement of the exhaust gas between the plurality of sets of diesel oxidation catalyst 2 and the soot filter 3. Hence, the processing capacity and the regeneration capacity of the plurality of sets of diesel oxidation catalyst 2 and soot filter 3 can be easily enhanced.

As shown in FIG. 1 to FIG. 5, the length in the direction in which the exhaust gas moves of the catalyst inner case 4 and filter inner case 20 is made different from the length in the direction in which the exhaust gas moves of the catalyst outer case 5 and filter outer case 21. Hence, the flange body for coupling the catalyst outer case 5 and the filter outer case 21 can be arranged offset with respect to a coupling position in which the plurality of sets of catalyst inner case 4 and filter inner case 20 are coupled to each other. An interval at which the plurality of sets of diesel oxidation catalyst 2 and soot filter 3 are fitted can be easily shortened or expanded.

As shown in FIG. 1 to FIG. 5, the present embodiment is provided with the plurality of sets of diesel oxidation catalyst 2 and soot filter 3, catalyst inner case 4 and filter inner case 20, and catalyst outer case 5 and filter outer case 21 and is constructed in such a way that the catalyst-side flange 25 and filter-side flange 26 for coupling the plurality of sets of catalyst outer case 5 and filter outer case 21 are arranged offset with respect to the coupling position in which the plurality of sets of diesel oxidation catalyst 2 and soot filter 3 are coupled to each other, whereas the present embodiment is constructed in such a way that the catalyst outer case 5 opposed to the other diesel oxidation catalyst 2 overlaps the filter inner case 20 opposed to the one soot filter 3.

Hence, although the interval at which the plurality of sets of diesel oxidation catalyst 2 and soot filter 3 are coupled can be shortened, the sensor and the like can be easily arranged in the portion where the plurality of sets of diesel oxidation catalyst 2 and soot filter 3 are coupled. By shortening the length in the direction in which the exhaust gas moves of the plurality of sets of catalyst outer case 5 and filter outer case 21, the plurality of sets of catalyst outer case 5 and filter outer case 21 can be increased in rigidity and decreased in weight. By shortening the interval at which the plurality of sets of diesel oxidation catalyst 2 and soot filter 3 are coupled, the length in the direction in which the exhaust gas moves of the plurality of sets of catalyst outer case 5 and filter outer case 21.

As shown in FIG. 1, FIG. 5, and FIG. 8 to FIG. 14, the present embodiment is provided with the diesel oxidation catalyst 2 or the soot filter 3 as the gas cleaning filter for cleaning the exhaust gas exhausted from the diesel engine 70, the catalyst inner case 4 or the filter inner case 20 as the inner case having the diesel oxidation catalyst 2 or the soot filter 3 fitted therein, and the catalyst outer case 5 or the filter outer case 21 as the outer case having catalyst inner case 4 or the filter inner case 20 fitted therein. Moreover, the present embodiment is constructed in such a way that: the exhaust gas inlet pipe 16 is arranged outside the catalyst outer case 5; the exhaust gas inflow port 12 is opened in the catalyst inner case 4 or the filter inner case 20 and the catalyst outer case 5 or the filter outer case 21 so as to be opposite to the exhaust gas outlet side of the exhaust gas inlet pipe 16; the exhaust gas inflow space 11 as a flow straightening chamber is formed between the end face of the catalyst outer case 5 on the upstream side in the direction in which the exhaust gas moves of the catalyst outer case 5 or the filter outer case 21 and the end face of the diesel oxidation catalyst 2 or the soot filter 3; and the exhaust gas inflow space 11 is made to communicate with the exhaust gas inlet pipe 16 via the exhaust gas inflow port 12. Thus, for example, in a structure in which the exhaust gas from the diesel engine 70 is let into the catalyst inner case 4 from a shearing direction perpendicular to the center line of the catalyst inner case 4, the exhaust gas inlet pipe 16 does not need to be inserted into the exhaust gas inflow space 11. This can decrease the number of constituent parts of the structure of the catalyst outer case 5 fitted in the exhaust gas inlet pipe 16 to reduce cost and can easily shorten the length in the direction in which the exhaust gas moves of the catalyst inner case 4 or the filer inner case 20, which are positioned on the upstream side of the exhaust gas, and the catalyst outer case 5 or the filer outer case 21 of the diesel oxidation catalyst 2 or the soot filter 3. That is, the relative interval between the exhaust gas inlet side of the diesel oxidation catalyst 2 and the upstream end faces in the direction in which the exhaust gas moves of the catalyst inner case 4 and the catalyst outer case 5, which are opposite to the exhaust gas inlet side of the diesel oxidation catalyst 2, can be easily shortened. The diesel oxidation catalyst 2 can be arranged close to the end faces of the catalyst inner case 4 and the catalyst outer case 5 on the upstream side in the direction in which the exhaust gas moves, whereby the length in the direction in which the exhaust gas moves of the catalyst inner case 4 or the filer inner case 20 and the catalyst outer case 5 or the filer outer case 21 can be shortened. Hence, the present embodiment can be constructed of a smaller number of parts, at lower cost, more compactly, and in lighter weight than ever.

As shown in FIG. 1, FIG. 5, and FIG. 8 to FIG. 14, the dimension of the opening of the exhaust gas inflow port 12 in a direction perpendicular to the direction in which the exhaust gas moves is made larger than the dimension of the opening of the exhaust gas inflow port 12 of the catalyst outer case 5 in the direction in which the exhaust gas moves of the catalyst outer case 5 or the filter outer case 21. Hence, the present embodiment can keep the rigidity when the exhaust gas inlet pipe 16 is fitted to the catalyst outer case 5 and can shorten the dimension in the direction in which the exhaust gas moves of the catalyst inner case 4 or the filter inner case 20 and the catalyst outer case 5 or the filter outer case 21, whereby the present embodiment can be constructed of a smaller number of parts, at lower cost, more compactly, and in lighter weight than ever.

As shown in FIG. 1, FIG. 5, and FIG. 8 to FIG. 14, the dimension of the opening of the exhaust gas inflow port 12 is made smaller in the direction in which the exhaust gas moves of the catalyst outer case 5 or the filter outer case 21 than the dimension of the opening of the exhaust gas outlet of the exhaust gas inlet pipe 16. Hence, the present embodiment can uniformly supply the exhaust gas from the exhaust gas inflow space 11 to the exhaust gas inlet side of the diesel oxidation catalyst 2 and can keep the gas cleaning function of the diesel oxidation catalyst 2 and can have the catalyst inner case 4 or the filter inner case 20 and the catalyst outer case 5 or the filter outer case 21 constructed more compactly and in lighter weight than ever.

As shown in FIG. 1, FIG. 5, and FIG. 8 to FIG. 14, the opening of the exhaust gas inflow port 12 formed in one of shapes of ellipse, rectangle, elongated hole, and their similar shapes, and the dimension of the opening of the exhaust gas inflow port 12 of the catalyst outer case 5 in the direction in which the exhaust gas moves of the catalyst outer case 5 or the filter outer case 21 is made nearly equal to the dimension of the diameter of the opening of the exhaust gas inlet side of the exhaust gas inlet pipe 16, so that the area of the opening of the exhaust gas inflow port 12 can be made larger than the area of the opening on the exhaust gas inlet side of the exhaust gas inlet pipe 16. Hence, while dispersing the exhaust gas in a direction perpendicular to the direction in which the exhaust gas moves of the diesel oxidation catalyst 2, the present embodiment can move the exhaust gas from the exhaust gas inflow port 12 into the exhaust gas inflow space 11 and hence can reduce the uneven flow of the exhaust gas to the diesel oxidation catalyst 2.

As shown in FIG. 1, FIG. 5, and FIG. 8 to FIG. 14, the present embodiment is constructed in such a way that: the dimension of the opening of the exhaust gas inflow port 12 of the catalyst outer case 5 in the direction in which the exhaust gas moves of the catalyst outer case 5 or the filter outer case 21 is made nearly equal to the dimension of the diameter of the opening on the exhaust gas inlet side of the exhaust gas inlet pipe 16; the dimension of the diameter of the exhaust gas inflow port 12 in a direction perpendicular to the direction in which the exhaust gas moves is made nearly equal to the dimension of the diameter of the opening on the exhaust outlet side of the exhaust gas inlet pipe 16; and of the opening edge of the exhaust gas inflow port 12, the opening edge of the exhaust gas inflow port 12 on the upstream side in the direction in which the exhaust gas moves has the end portion on the exhaust gas outlet side of the exhaust gas inlet pipe 16 coupled thereto. Hence, the present embodiment can disperse the exhaust gas in the direction perpendicular to the direction in which the exhaust gas moves of the diesel oxidation catalyst 2 and can uniformly move the exhaust gas to the exhaust gas inlet side of the diesel oxidation catalyst 2 from the exhaust gas inflow port 12. Therefore, the present embodiment can decrease the uneven flow of the exhaust gas to the diesel oxidation catalyst 2 and hence can enhance the exhaust gas cleaning capacity of the diesel oxidation catalyst 2.

A structure for fitting a silencer 30 will be described with reference to FIG. 1 to FIG. 3 and FIG. 5 to FIG. 7. A shown in FIG. 1 to FIG. 3 and FIG. 5, the silencer 30 for damping the sound of the exhaust gas exhausted from the diesel engine 70 includes a silencer inner case 31 made of a heat resistant metal material nearly in the shape of a cylinder, a silencer outer case 32 made of a heat resistant metal material nearly in the shape of a cylinder, and a circular disk-shaped right cover body 33 fixed by welding to the right end portions of the silencer inner case 31 and the silencer outer case 32. The silencer inner case 31 is fitted in the silencer outer case 32. Here, the dimension of the diameter of the cylindrical catalyst inner case 4, the dimension of the diameter of the cylindrical filter inner case 20, and the dimension of the cylindrical silencer inner case 31 are made nearly equal to each other. Further, the dimension of the diameter of the cylindrical catalyst outer case 5, the dimension of the diameter of the cylindrical filter outer case 21, and the dimension of the cylindrical silencer outer case 32 are made nearly equal to each other.

As shown in FIG. 4 to FIG. 7, an exhaust gas outlet pipe 34 is passed through the silencer inner case 31 and the silencer outer case 32. One end side of the exhaust gas outlet pipe 34 is closed by an outlet cover body 35. Many exhaust holes 36 are made in the entire portion of the exhaust gas outlet pipe 34 in the silencer inner case 31. The interior of the silencer inner case 31 is made to communicate with the exhaust gas outlet pipe 34 via many exhaust holes 36. A tail pipe 135 as an exhaust gas pipe, which will be described later, and an existing sound damping material (not shown in the drawing) are connected to the other end side of the exhaust gas outlet pipe 34.

Figure 6:
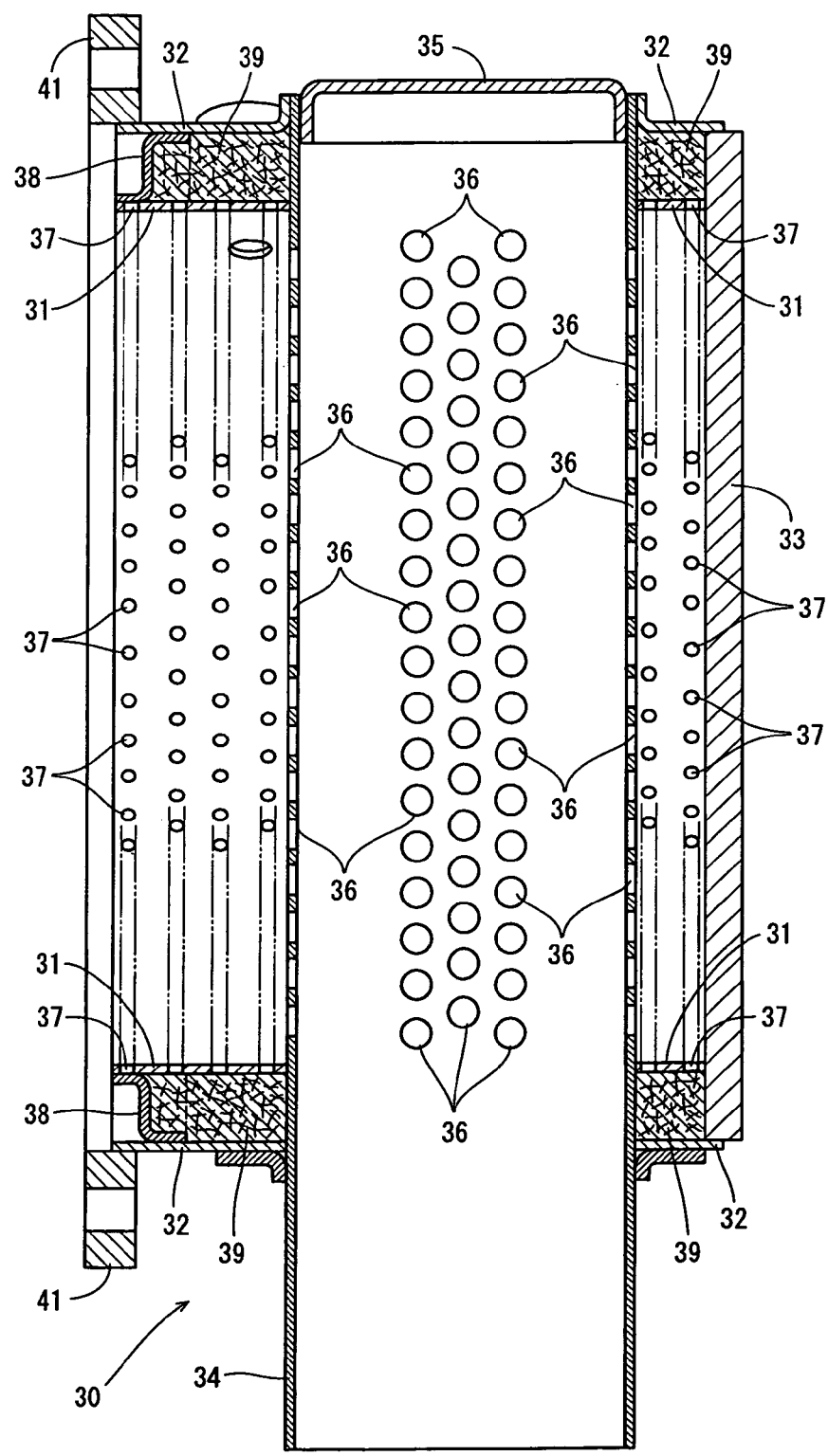
FIG. 6 is an enlarged cross-sectional view, when viewed from the front, of an exhaust gas outflow side of the same.

As shown in FIG. 6, 7, the silencer inner case 31 has many silencer holes 37 made therein. The interior of the silencer inner case 31 is made to communicate with a space between the silencer inner case 31 and the silencer outer case 32 via many silencer holes 37. The space between the silencer inner case 31 and the silencer outer case 32 is closed by the right cover body 33 and a support body 38 made of a thin plate. The space between the silencer inner case 31 and the silencer outer case 32 is filled with a silencer material 39 made of ceramic fiber. The end portion on the upstream side (left side), in which the exhaust gas moves, of the silencer inner case 31 is coupled to the end portion on the upstream side (left side), in which the exhaust gas moves, of the silencer outer case 32 via the support body 38 made of a thin plate.

According to the above-mentioned construction, the exhaust gas is exhausted through the exhaust gas outlet pipe 34 from inside the silencer inner case 31. In the silencer inner case 31, the sound of the exhaust gas (sound of a high-frequency band) is absorbed by the silencer material 39 through many silencer holes 37. The noises of the exhaust gas emitted from the outlet side of the exhaust gas outlet pipe 34 are damped.

As shown in FIG. 1 and FIG. 5, a filter-side outlet flange 40 is welded to the end portions on the downstream side (right side), in which the exhaust gas moves, of the filter inner case 20 and the filter outer case 21. A silencer-side flange 41 is welded to the end portion on the upstream side (left side), in which the exhaust gas moves, of the silencer outer case 32. The filter-side outlet flange 40 is detachably fastened to the silencer-side flange 41 by bolts 42 and nuts 43. Here, a sensor connection plug 44 is fixed to the filter inner case 20 and the filter outer case 21. The sensor connection plug 44 has an outlet-side exhaust gas pressure sensor and an outlet-side exhaust gas temperature sensor (thermistor), both of which are not shown in the drawing, connected thereto.

As shown in FIG. 1, FIG. 2, and FIG. 5 to FIG. 7, the present embodiment is the exhaust gas cleaning device provided with the diesel oxidation catalyst 2 or the soot filter 3 as the gas cleaning filter for cleaning the exhaust gas exhausted from the diesel engine 70, the catalyst inner case 4 or the filter inner case 20 as the inner case having the diesel oxidation catalyst 2 or the soot filter 3 fitted therein respectively, and the catalyst outer case 5 or the filter outer case 21 as the outer case having the catalyst inner case 4 or the filter inner case 20 fitted therein respectively, which is provided with the silencer material 39 as an exhaust sound damping material for damping the exhaust sound of the exhaust gas exhausted from the diesel engine 70, the silencer material 39 being arranged at the end portion on the exhaust gas outlet side of the catalyst outer case 5 or the filter outer case 21. Hence, the present embodiment can keep the exhaust gas cleaning function of the diesel oxidation catalyst 2 or the soot filter 3 and can easily have the function of silencing the exhaust gas added thereto without changing the structure of the diesel oxidation catalyst 2 or the soot filter 3. For example, an exhaust structure for directly coupling the tail pipe 135 (exhaust gas pipe) to the outer case and an exhaust structure for enhancing the silencing function of the existing silencing can be easily constructed. Further, countermeasures for reducing the high-frequency sound of the exhaust gas, which have been difficult to take at the portion of the diesel oxidation catalyst 2 or the soot filter 3, can be easily taken. For example, a silencer structure (silencer material 39) formed of punched holes and a fiber-shaped mat or the like can be easily fitted.

Figure 7:
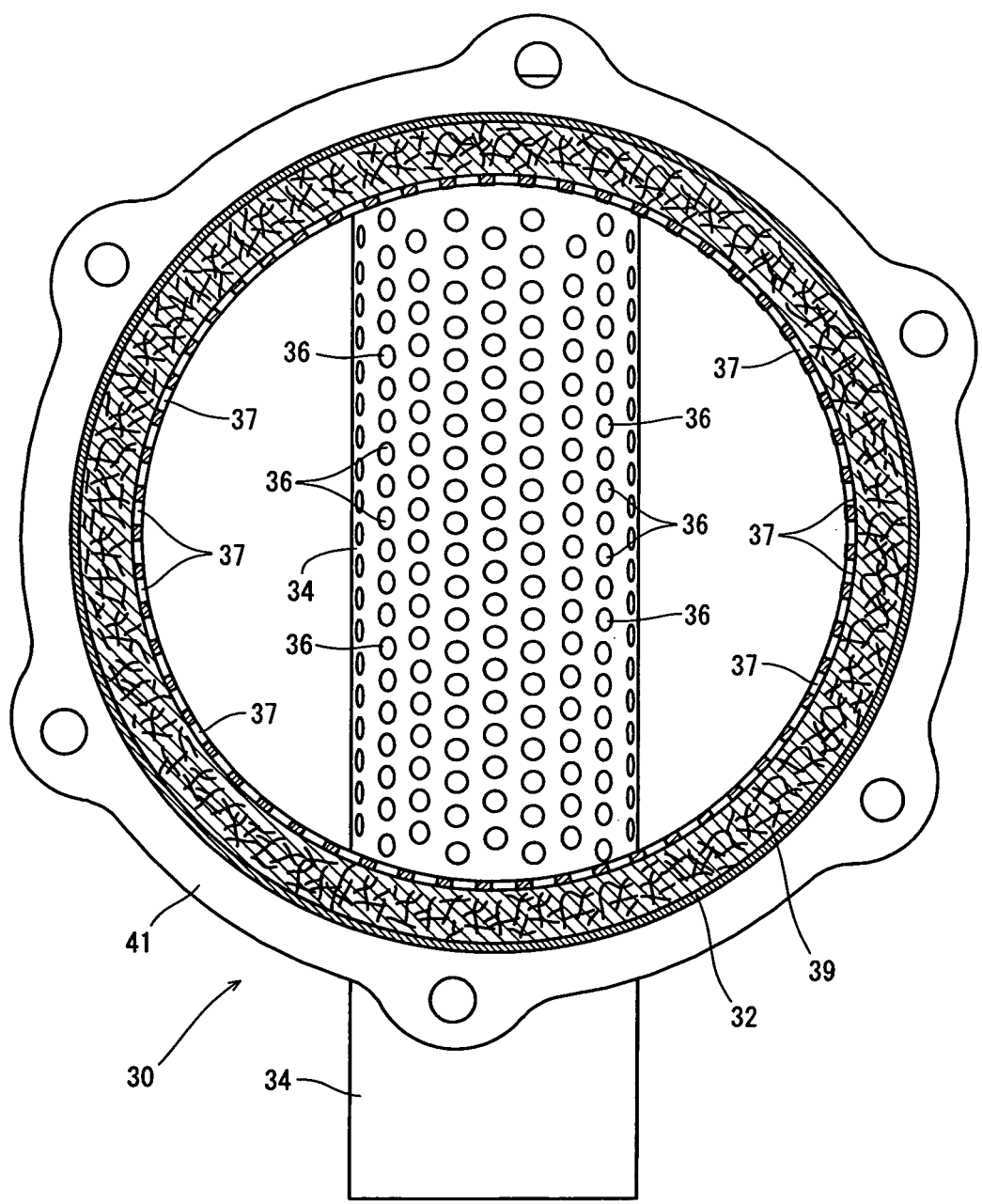
FIG. 7 is an enlarged cross-sectional view, when viewed from the side, of an exhaust gas outflow side of the same.

As shown in FIG. 5 to FIG. 7, the present embodiment is provided with the silencer 30 having the silencer material 39 and is constructed in such a way that the silencer 30 is detachably coupled to the end portion on the exhaust gas outlet side of the filter outer case 21. Hence, the function of silencing the sound of the exhaust gas at the diesel oxidation catalyst 2 or the soot filter 3 can be easily changed by coupling or removing the silencer 30.

As shown in FIG. 5 to FIG. 7, the present embodiment is provided with the silencer 30 having the silencer material 39 and with the catalyst outer case 5 or the filter outer case 21 and the silencer 30 formed respectively in the shape of a circular cylinder having a nearly equal outside diameter and with a filter-side outlet flange 40, which is shaped like a ring and fitted to the end portion on the exhaust gas outlet side of the filter outer case 21 and acts as a flange body, and is constructed in such a way that the silencer material 39 can be detachably coupled to the end portion on the exhaust gas outlet side of the filter outer case 21 via the filter-side outlet flange 40. Hence, when the silencer 30 having the outside diameter nearly equal to the outside diameter of the filter outer case 21 is coupled to the filter outer case 21 by the filter-side outlet flange 40, the silencer 30 can be compactly fitted only by elongating the fitting dimension of the catalyst outer case 5 or the filter outer case 21 in the direction in which the exhaust gas moves. For example, the catalyst outer case 5 or the filter outer case 21 can be easily fitted close to the side surface of an exhaust gas exhausting portion of the diesel engine 70. Further, the gas cleaning function of the diesel oxidation catalyst 2 or the soot filter 3 can be enhanced by keeping the temperature of the exhaust gas, and the countermeasures for reducing the high-frequency sound of the exhaust gas can be easily taken by fitting the silencer material 39.

As shown in FIG. 5 to FIG. 7, the present embodiment is provided with the silencer inner case 31 and the silencer outer case 32 as a silencer casing having the silencer material 39 built therein and with the exhaust gas outlet pipe 34 having one end side closed and having the other end side made to communicate with the tail pipe 135, and is constructed in such a way that a portion, in which exhaust holes 36 are formed, of the exhaust gas outlet pipe 34 is passed through the silencer inner case 31 and the silencer outer case 32 and that the silencer inner case 31 and the silencer outer case 32 are detachably coupled to the end portion on the exhaust gas outlet side of the filter outer case 21 via the filter-side outlet flange 40. Hence, the function of silencing the exhaust gas at the position of the diesel oxidation catalyst 2 or the soot filter 3 can be easily changed by removing or coupling the silencer inner case 31 and the silencer outer case 32. For example, an exhaust structure for further enhancing the function of silencing the exhaust gas can be easily constructed by arranging a silencer member (not shown in the drawing) aside from the silencer inner case 31 and the silencer outer case 32. On the other hand, an exhaust structure for coupling the tail pipe 135 directly to the filter outer case 21 can be easily constructed by arranging the silencer inner case 31 and the silencer outer case 32 in which the silencer material 39 is not built. Further, as the countermeasures for reducing high-frequency sound of the exhaust gas, which have been difficult to take at the position of the diesel oxidation catalyst 2 or the soot filter 3, a silencer structure using the silencer material 39 (punched holes and fiber-shaped mat) can be easily constructed in the silencer inner case 31 and the silencer outer case 32.

As shown in FIG. 5 to FIG. 7, the silencer casing includes the cylindrical silencer inner case 31 and the cylindrical silencer outer case 32 and has the cylindrical silencer inner case 31 arranged in the cylindrical silencer outer case 32 and has the silencer material 39 filled in the space between the cylindrical silencer inner case 31 and the cylindrical silencer outer case 32 and has many silencer holes 37 formed in the cylindrical silencer inner case 31. Hence, the silencer casing (the silencer inner case 31 and the silencer outer case 32) can be constructed in such a way as to be similar to the exhaust gas cleaning structure having the catalyst inner case 4 or the filter inner case 20, which has the diesel oxidation catalyst 2 or the soot filter 3 fitted therein respectively, and the catalyst outer case 5 or the filter outer case 21. The silencer inner case 31 and the silencer outer case 32 of the silencer casing can be formed of the same material (pipe or the like) that forms the catalyst inner case 4 or the filter inner case 20, which has the diesel oxidation catalyst 2 or the soot filter 3 fitted therein respectively, and the catalyst outer case 5 or the filter outer case 21. Hence, the manufacturing cost of the silencer casing can be easily reduced.

Figure 10:
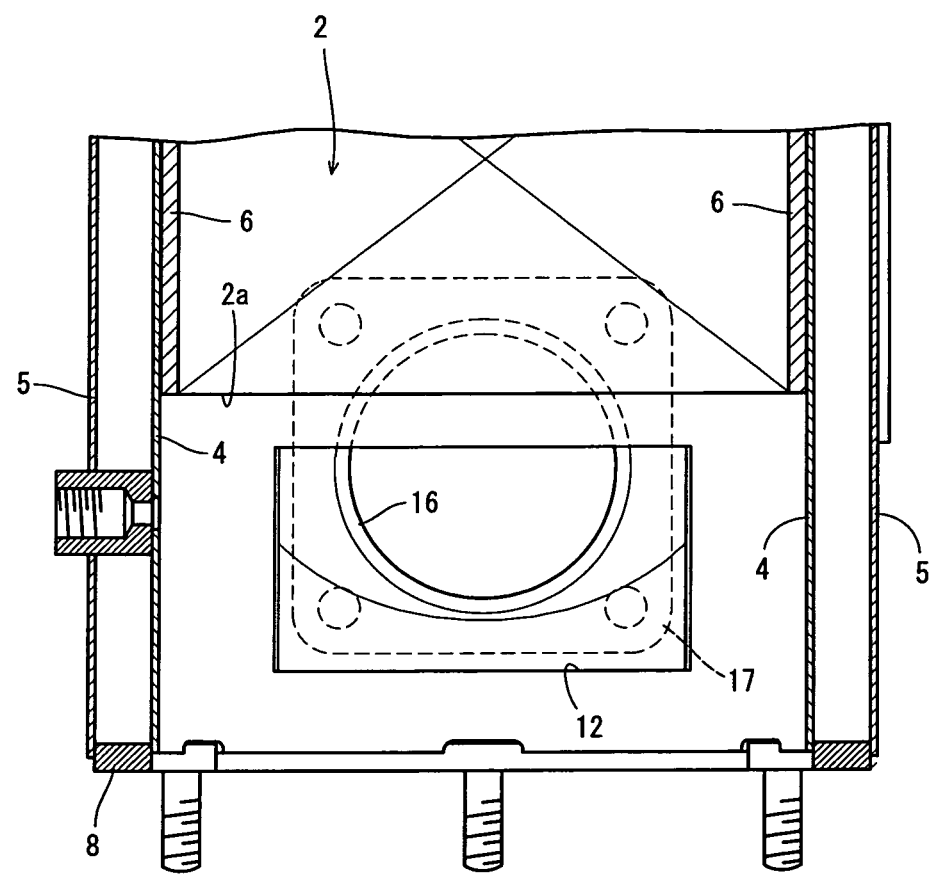
FIG. 10 is an enlarged cross-sectional view, when viewed in a plan view, of an exhaust gas inflow side, which shows a modified example of FIG. 9.
Figure 11:
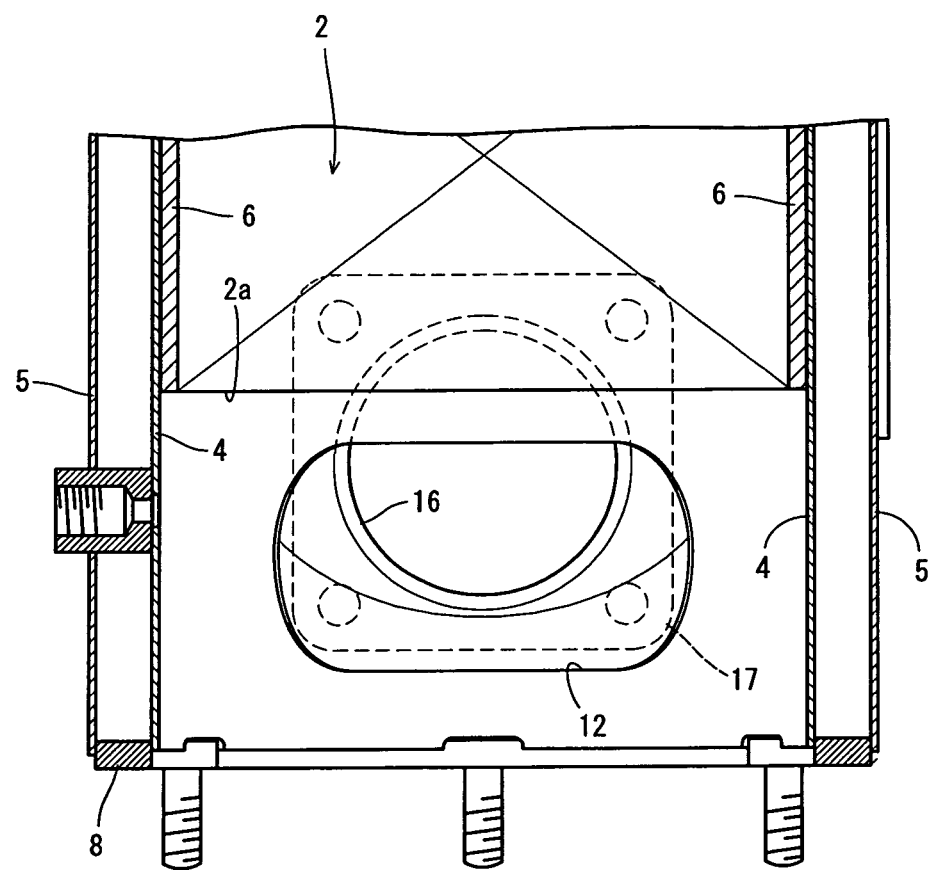
FIG. 11 is an enlarged cross-sectional view, when viewed in a plan view, of an exhaust gas inflow side, which shows another modified example of FIG. 9.
Figure 12:
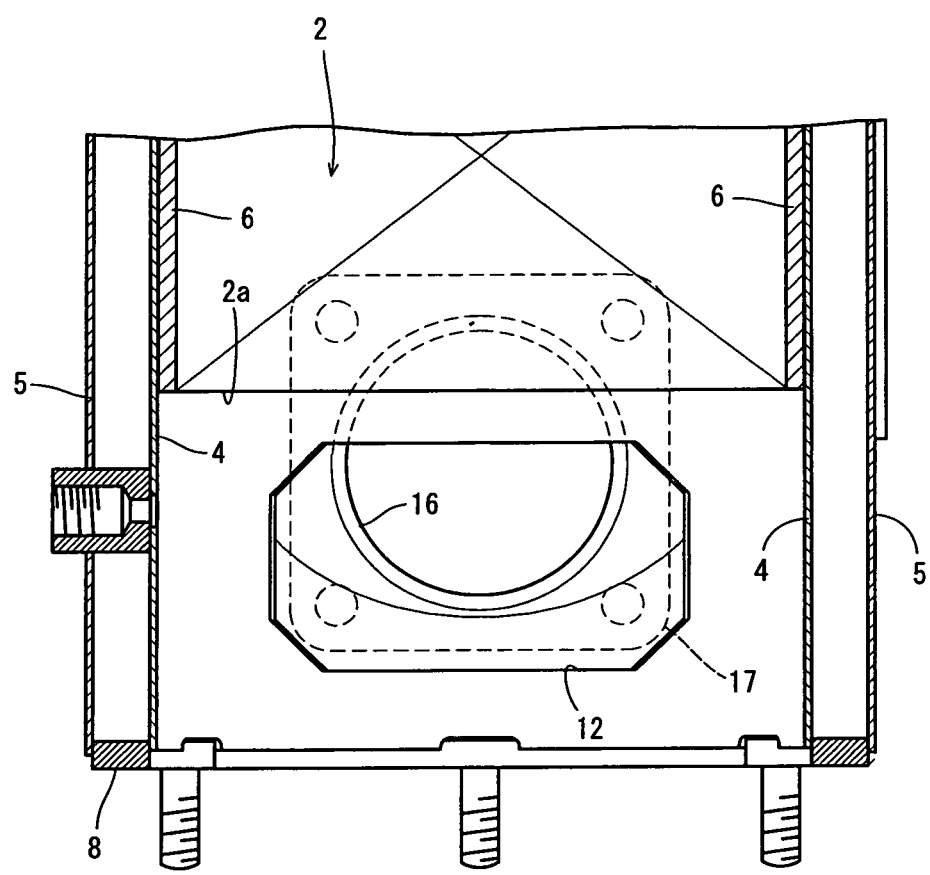
FIG. 12 is an enlarged cross-sectional view, when viewed in a plan view, of an exhaust gas inflow side, which shows still another modified example of FIG. 9.
Figure 13:
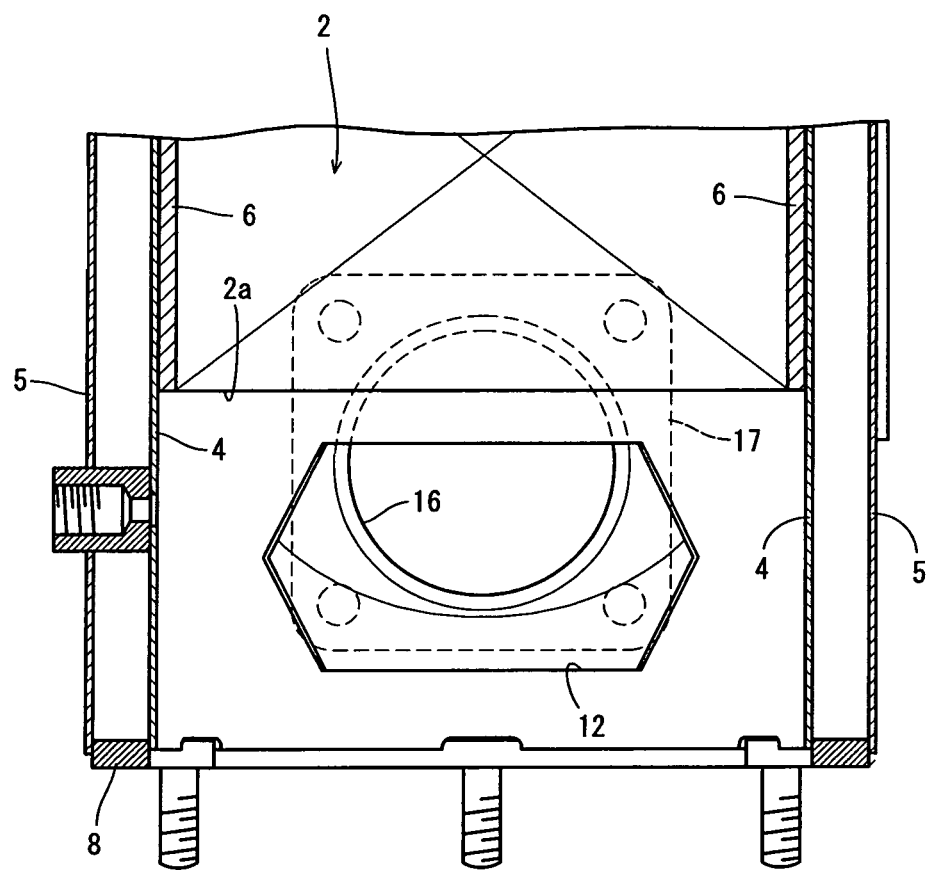
FIG. 13 is an enlarged cross-sectional view, when viewed in a plan view, of an exhaust gas inflow side, which shows still another modified example of FIG. 9.
Figure 14:
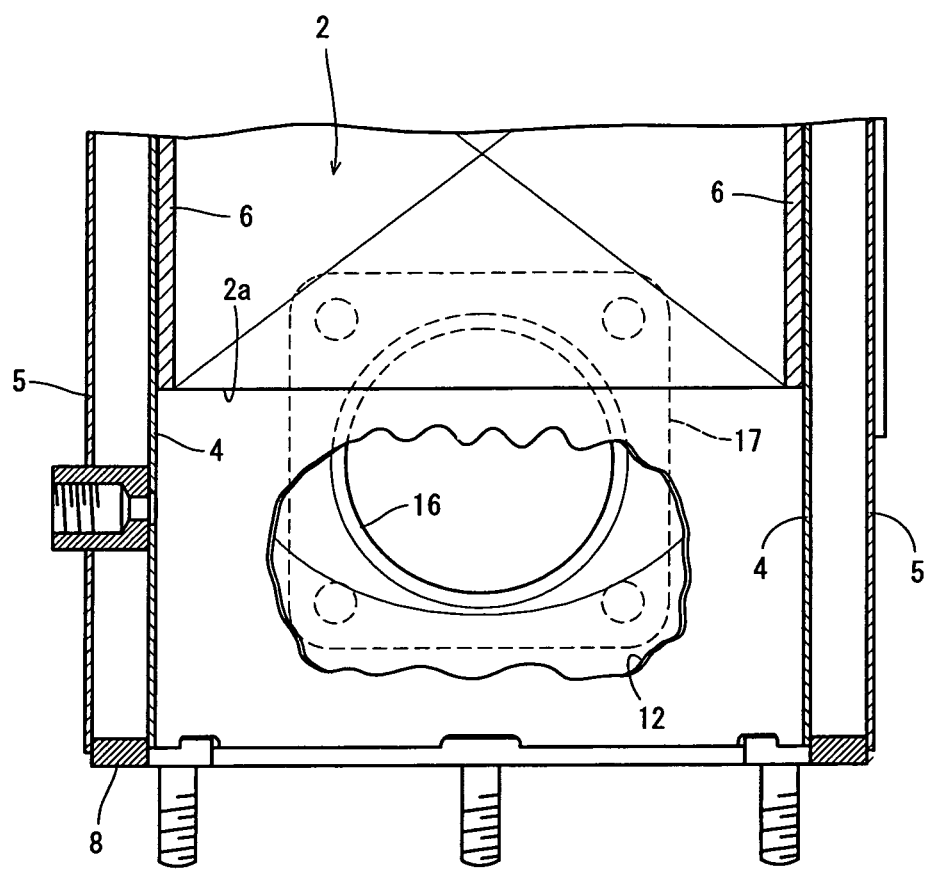
FIG. 14 is an enlarged cross-sectional view, when viewed in a plan view, of an exhaust gas inflow side, which shows still another modified example of FIG. 9.

Modified structures of the exhaust gas inflow port 12 will be described with reference to FIG. 10 to FIG. 14. In the above-mentioned embodiment, as shown in FIG. 9, the exhaust gas inflow port 12 is formed by making a through hole nearly shaped like an ellipse in the catalyst inner case 4 and the catalyst outer case 5. As shown in FIG. 10, the exhaust gas inflow port 12 can be formed by making a through hole nearly shaped like a rectangle in the catalyst inner case 4 and the catalyst outer case 5. Further, as shown in FIG. 11, the exhaust gas inflow port 12 can be formed by making a through hole nearly shaped like an elongated circle in the catalyst inner case 4 and the catalyst outer case 5. Still further, as shown in FIG. 12, the exhaust gas inflow port 12 can be formed by making a through hole nearly shaped like a polygon in the catalyst inner case 4 and the catalyst outer case 5. Still further, as shown in FIG. 13, the exhaust gas inflow port 12 can be formed by making a through hole nearly shaped like a hexagon in the catalyst inner case 4 and the catalyst outer case 5. Still further, as shown in FIG. 14, the exhaust gas inflow port 12 can be formed by making a through hole of an indefinite shape in the catalyst inner case 4 and the catalyst outer case 5.

A structure in which the diesel engine 70 is provided with the DPF 1 will be described with reference to FIG. 15 to FIG. 18. As shown in FIG. 15 to FIG. 18, an exhaust manifold 71 is arranged on the left side surface of a cylinder head 72 of the diesel engine 70, and an intake manifold 73 is arranged on the right side surface of the cylinder head 72 of the diesel engine 70. The cylinder head 72 is mounted on a cylinder block 75 having an engine output shaft 74 (crankshaft) and a piston (not shown in the drawing). The front end and the rear end of the engine output shaft 74 are protruded from the front surface and the rear surface of the cylinder block 75, respectively. A cooling fan 76 is provided on the front side surface of the cylinder block 75. A rotational force is transmitted to the cooling fan 76 via a V-belt 77 from the front end side of the engine output shaft 74.

Figure 15:
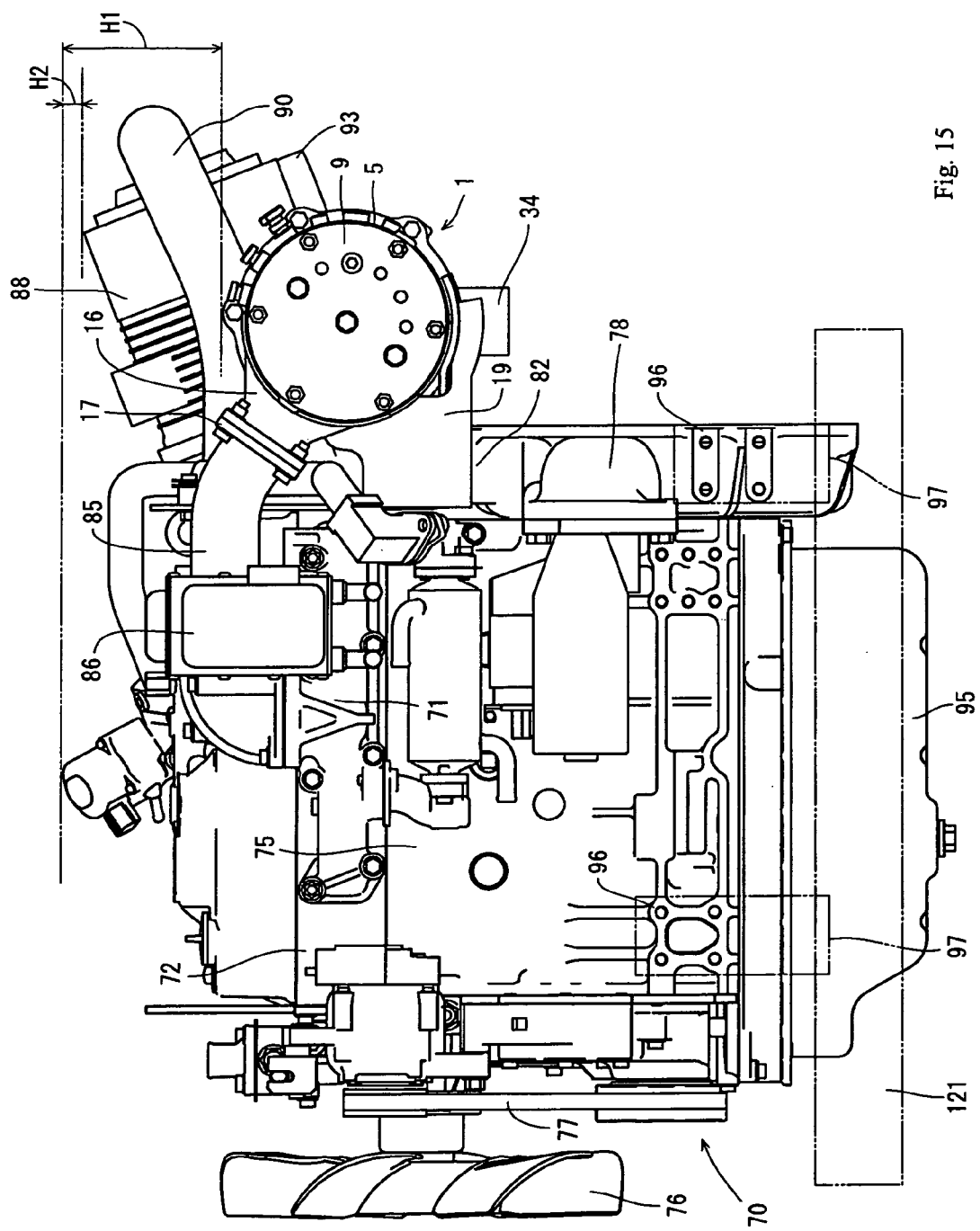
FIG. 15 is a left side view of a diesel engine.
Figure 16:
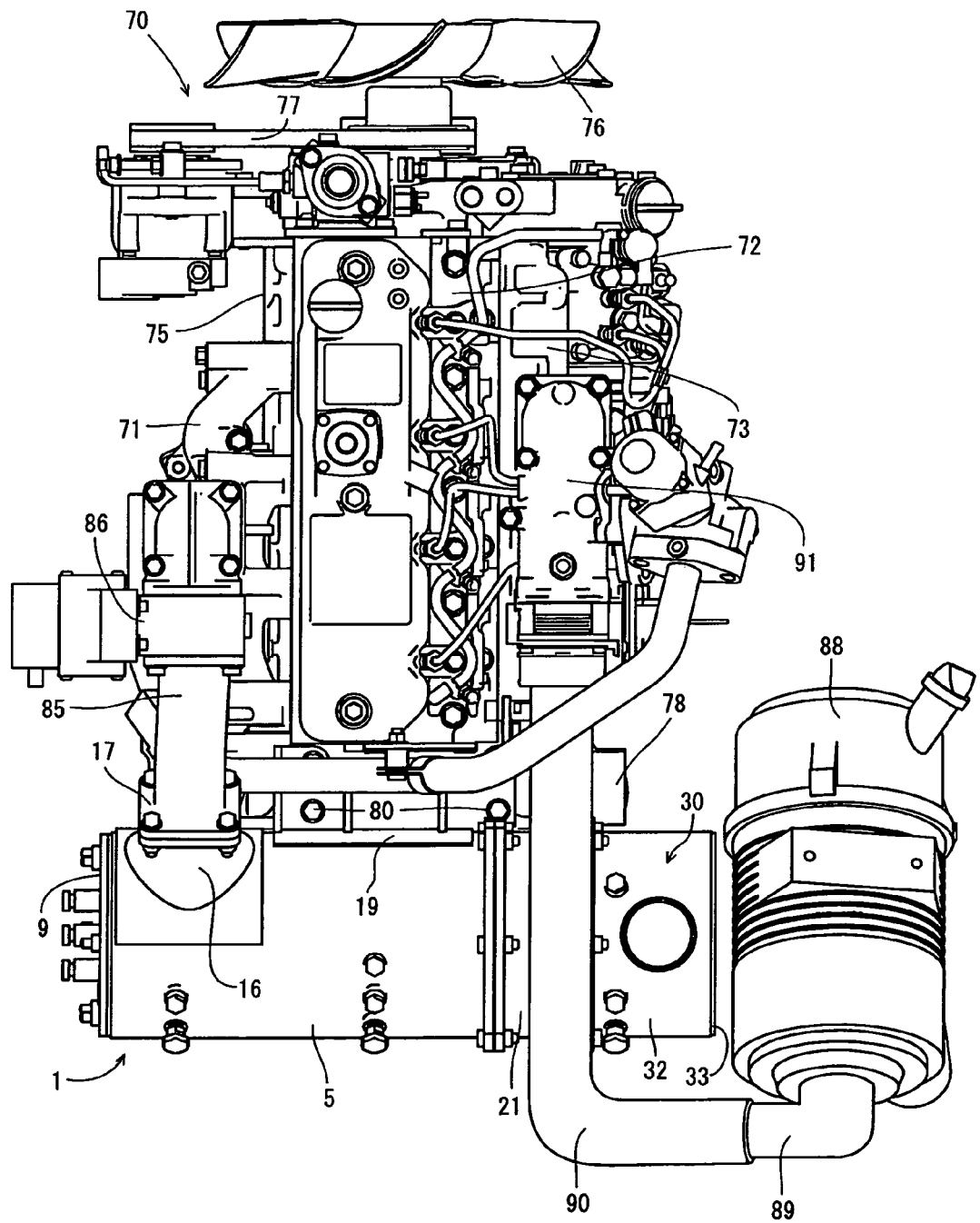
FIG. 16 is a plan view of the diesel engine.
Figure 18:
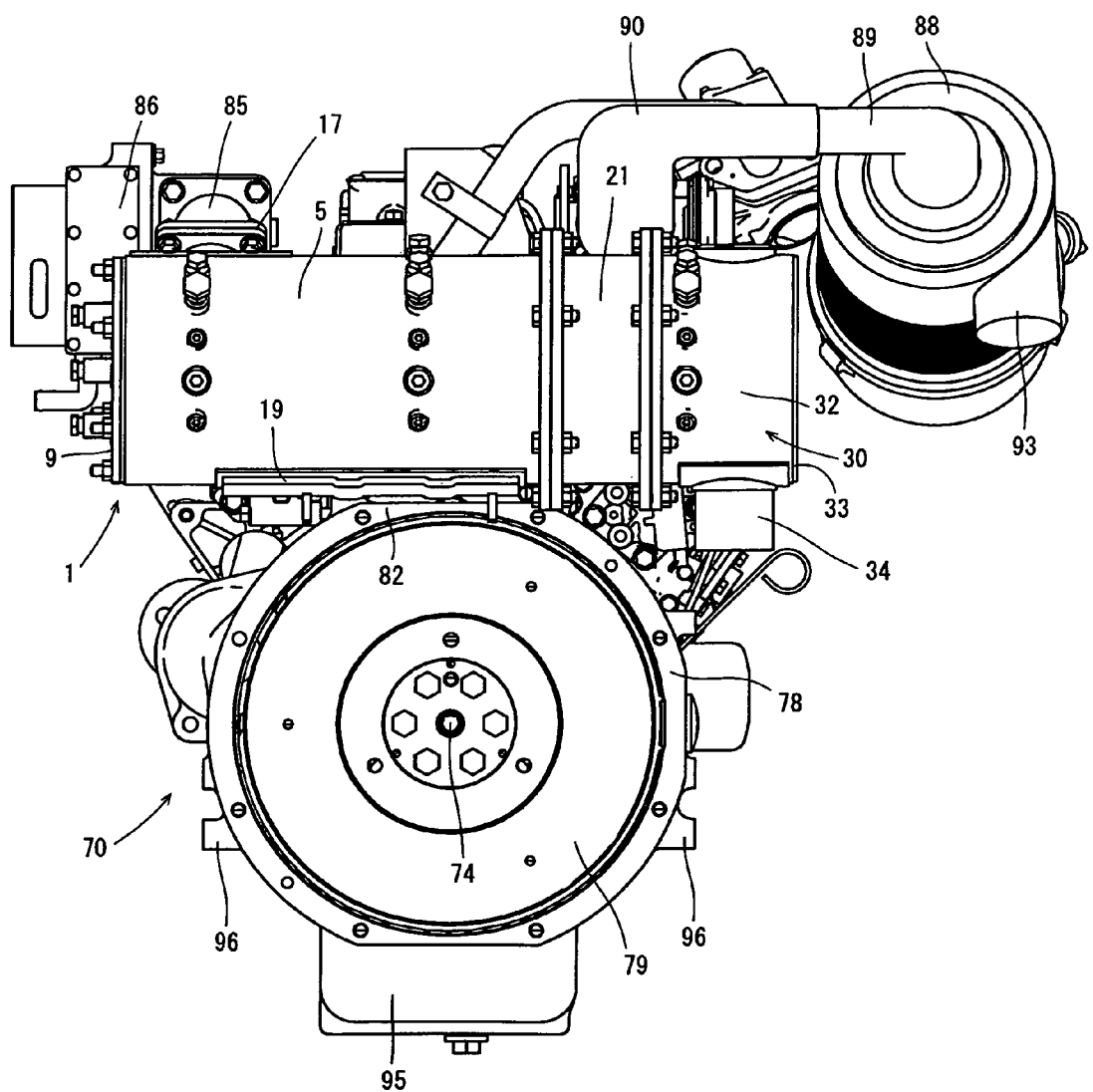
FIG. 18 is a rear view of the diesel engine.

As shown in FIG. 15, FIG. 16, and FIG. 18, a flywheel housing 78 is fixed to the rear surface of the cylinder block 75. A flywheel 79 is fitted in the flywheel housing 78. The flywheel 79 is pivotally supported by the rear end side of the engine output shaft 74. The power of the diesel engine 70 is taken out to a hydraulic pump 132 of a backhoe 100, which will be described later, via the flywheel 79.

Further, an oil pan 95 is arranged on the bottom surface of the cylinder block 75. Engine fitting leg parts 96 are fitted to the left and right side surfaces of the cylinder block 75 and the left and right side surfaces of the flywheel housing 78, respectively. The respective engine fitting leg parts 96 have engine leg bodies 97 fastened thereto by bolts, the engine leg bodies 97 having vibration isolation rubber. The diesel engine 70 is supported by an engine support chassis 121 as a chassis for forming an engine room via the respective engine leg bodies 97 in such a way as to be isolated from vibrations (see FIG. 24), the engine support chassis 121 being described later.

Figure 17:
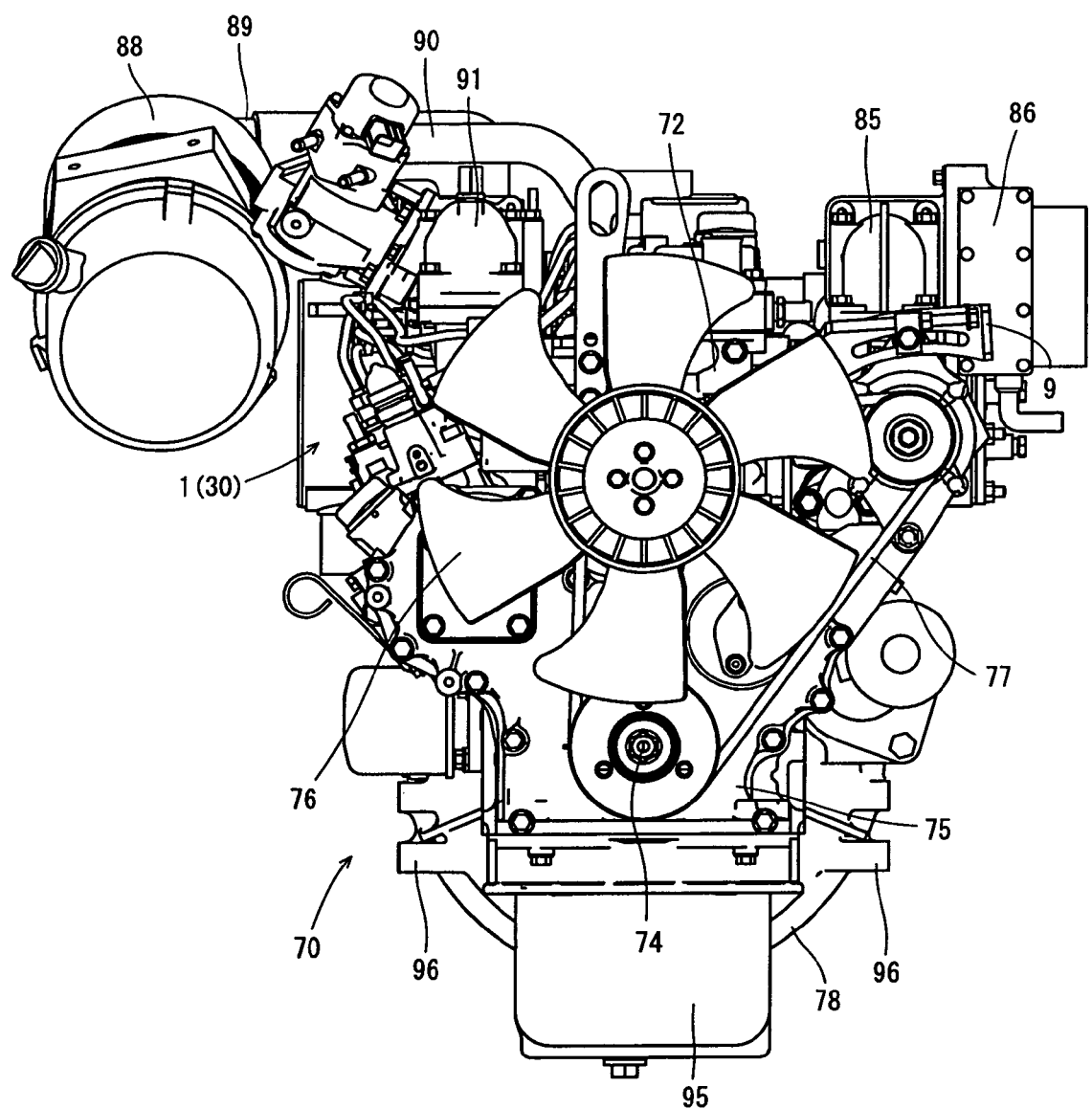
FIG. 17 is a front view of the diesel engine.

As shown in FIG. 15, FIG. 17, and FIG. 18, one end side of the support leg body 19 as a filter support body is fixed by welding to the outer face of the catalyst outer case 5. The other end side of the support leg body 19 is detachably fastened to a fitting part 82 formed on the upper surface of the flywheel housing 78 by bolts 80. Thus, the DPF 1 is supported by the flywheel housing 78 of high rigidity via the support leg body 19.

As shown in FIG. 15 to FIG. 18, an air cleaner 88 for cleaning air introduced into the engine 70 is arranged on the silencer 30 side of the DPF 1 (on the downstream side in which the exhaust gas moves, on the right side in the present embodiment) 91. An air intake outlet pipe 89 protruding from one side surface of the air cleaner 88 is coupled to the inlet side of the intake manifold 73 via a connection intake pipe 90 and an EGR unit (exhaust gas recirculation unit). An outside air introduction pipe 93 for introducing outside air into the air cleaner 88 is coupled to the outer peripheral face of the air cleaner 88.

Hence, the outside air sucked into the air cleaner 88 from the outside air introduction pipe 93 has dust removed and is cleaned by the air cleaner 88 and is sent to the intake manifold 73 via the air intake outlet pipe 89, the connection intake pipe 90, and the EGR unit 91 and then is supplied to the respective cylinders of the diesel engine 70. Here, the air cleaner 88 is suspended by a canopy fitting chassis 122, which will be described later, via a cleaner support leg 92 (see FIG. 23).

As shown in FIG. 16, the EGR unit 91 has an EGR main case (collector) 145 that mixes the recirculated exhaust gas from the diesel engine 70 (EGR gas from the exhaust manifold 71) with fresh air (outside air from the air cleaner 88) to supply the mixed air to the intake manifold 73, an intake throttle valve 146 for making the EGR main case (collector) 145 communicate with the connection intake pipe 90, a recirculated exhaust gas pipe 148 connected to the exhaust manifold 71 via an EGR cooler 147, and an EGR valve 169 for making the EGR main case 145 communicate with the recirculated exhaust gas pipe 148.

According to the above-mentioned construction, the outside air is supplied into the EGR main case 145 from the air cleaner 88 via the intake throttle valve 146, whereas EGR gas (part of the exhaust gas emitted from the exhaust manifold 71) is supplied into the EGR main case 145 from the exhaust manifold 71 via the EGR valve 169. The outside air from the air cleaner 88 is mixed with the EGR gas from the exhaust manifold 71 in the EGR main case 145, and the mixed gas in the EGR main case 145 is supplied to the intake manifold 73. That is, a part of the exhaust gas emitted to the exhaust manifold 71 from the diesel engine 70 is returned to the diesel engine 70 from the intake manifold 73, whereby a maximum combustion temperature at a load operation is decreased to reduce the amount of NOx (nitrogen oxide) emitted from the diesel engine 70.

As shown in FIG. 15 to FIG. 18, the DPF 1 of the present embodiment is formed in the shape of a cylinder elongated in a direction perpendicular to the engine output shat 74 and is arranged separately from the upper surface of the diesel engine 70 in such a way that the direction in which the exhaust gas moves is perpendicular to the engine output shaft 74 above the flywheel housing 78. Further, the air cleaner 88 is also formed in the shape of a cylinder as in the case of the DPF 1 and is arranged on the silencer 30 side (right side) of DPF 1 separately from the upper surface of the diesel engine 70. Hence, the cylinder head 72, the exhaust manifold 71, and the intake manifold 73 have their upper surfaces exposed to the outside and hence are in the state where they easily undergo the maintenance work. In this state, the DPF 1 is opposed to one side surface close to the flywheel housing 78 in the cylinder head 72.

As shown in FIG. 15, the DPF 1 has its upper end set at a position lower than the upper end of the diesel engine 70 by a level difference H1. When the diesel engine 70 is viewed from a cooling fan 76 side (see FIG. 17), almost all portion of the DPF 1 is hidden by the diesel engine 70. Further, the air cleaner 88 also has its upper end set at a lower position than the upper end of the diesel engine 70 by a level difference H2.

The exhaust gas inlet pipe 16 of the DPF 1 is detachably coupled to the exhaust manifold 71 of the diesel engine 70 via a connection exhaust pipe 85 extending in the direction of the engine output shaft 74. An exhaust throttle device 86 for regulating the exhaust pressure of the diesel engine 70 is fitted in a middle portion in the longitudinal direction of the connection exhaust pipe 85.

The exhaust throttle device 86 is intended to regenerate the soot filter 3. That is, when soot is deposited on the soot filter 3, the exhaust throttle device 86 controls the diesel engine 70 to increase the exhaust pressure to raise the temperature of the exhaust gas exhausted from the diesel engine 70, whereby the soot deposited on the soot filter 3 is burned. As a result, the soot is eliminated, which results in regenerating the soot filter 3.

Hence, even when an operation is continuously performed in which the temperature of the exhaust gas is prone to become low because load is low, the soot filter 3 can be regenerated by increasing the exhaust pressure forcibly by the exhaust throttle device 86 and hence the exhaust gas cleaning capacity of the DPF 1 can be properly kept. Further, a burner or the like for burning the soot deposited on the soot filter 3 is not required.

The exhaust gas moving into the DPF 1 from the exhaust manifold 71 of the diesel engine 70 via the connection exhaust pipe 85 and the exhaust gas inlet pipe 16 is cleaned by the DPF 1 and then is moved to the tail pipe 135, which will be described later, from the exhaust gas outlet pipe 34 and then is finally emitted to the outside of the machine.

Figure 19:
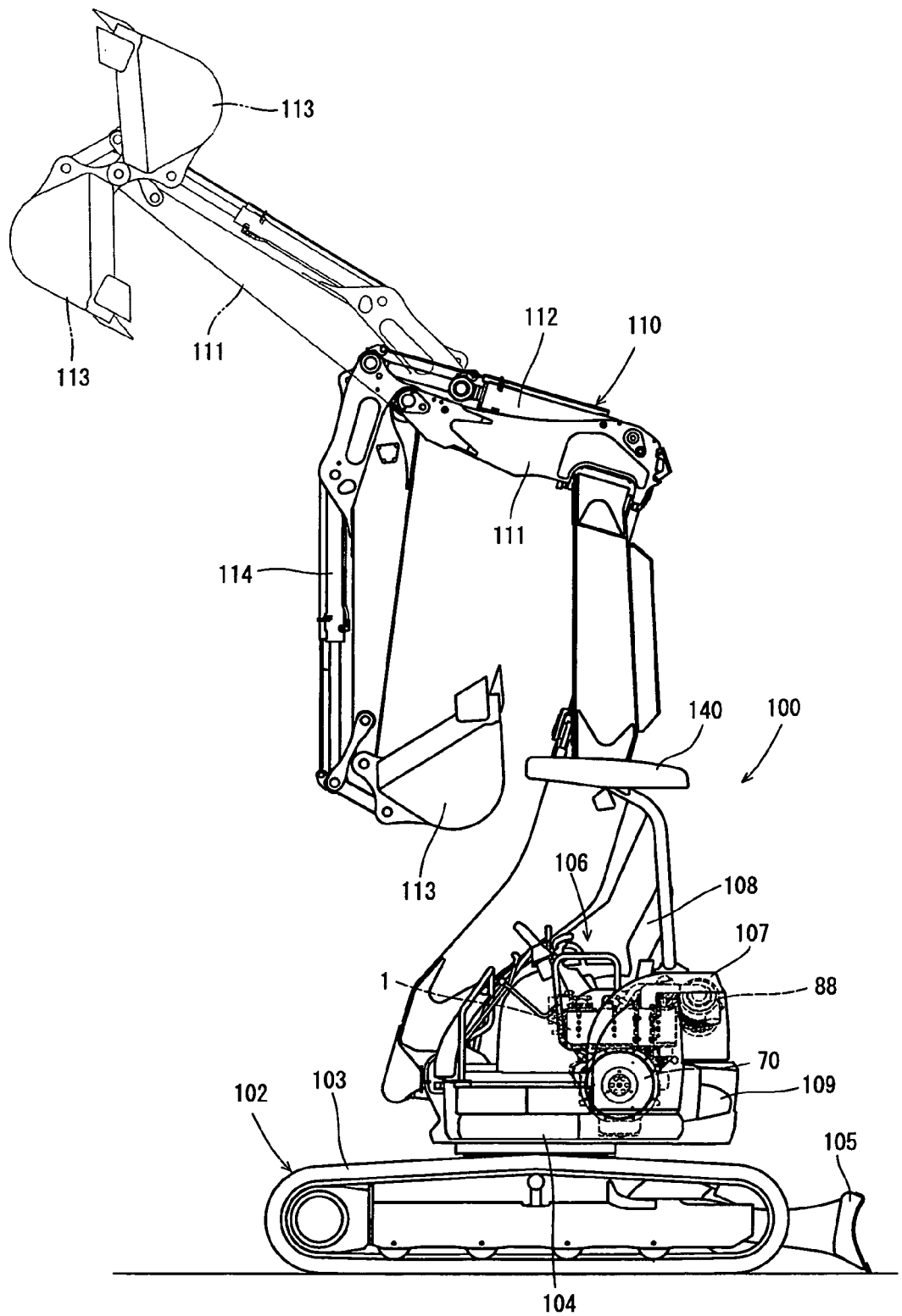
FIG. 19 is a side view of a backhoe.
Figure 20:
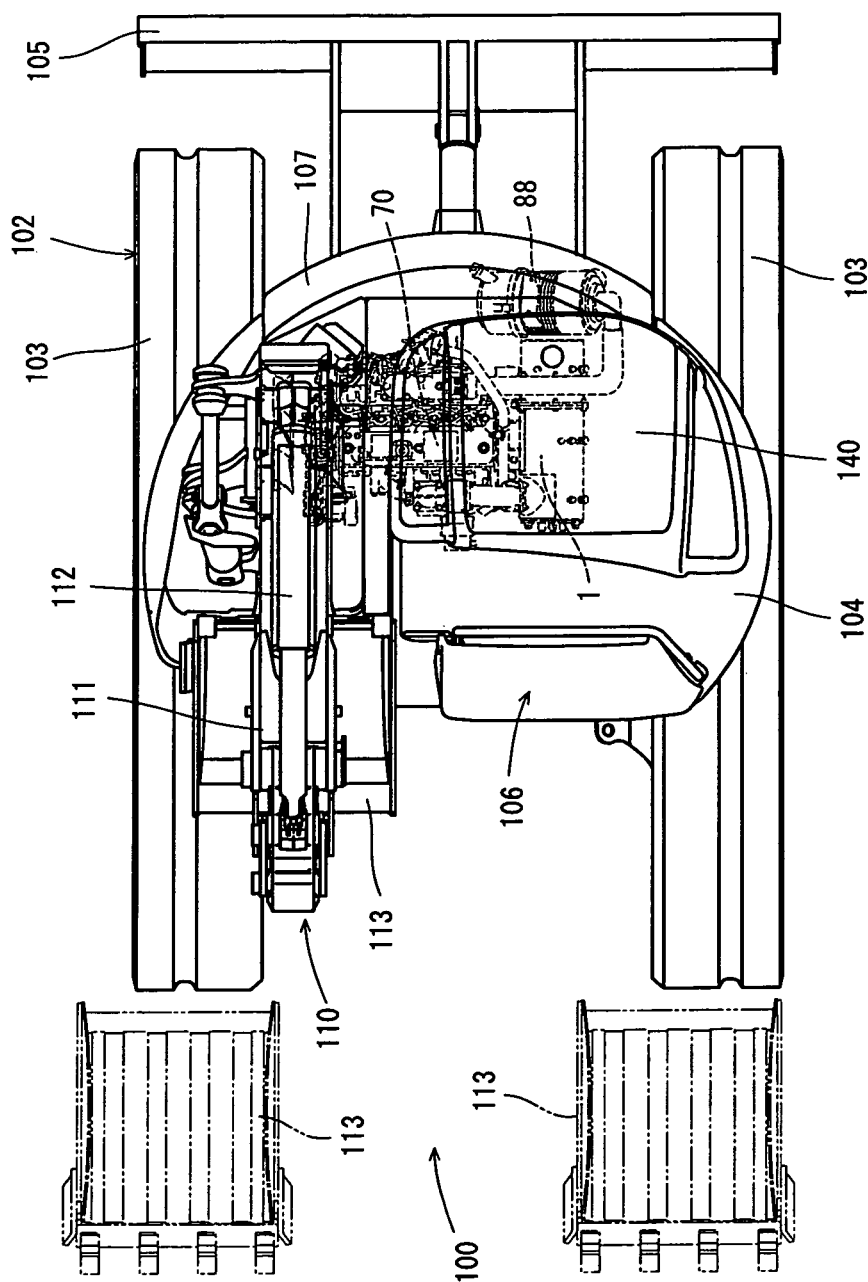
FIG. 20 is a plan view of the backhoe.

A structure in which the diesel engine 70 is mounted in the backhoe 100 as a work vehicle will be described with reference to FIG. 19 to FIG. 24. As shown in FIG. 19 and FIG. 20, the backhoe 100 is provided with a caterpillar type travel unit 102 having a pair of left and right travel crawlers 103 and with a turning machine body 104 mounted on the travel unit 102. The turning machine body 104 is driven by a hydraulic motor (not shown in the drawing) for turning, thereby being horizontally turned in all directions of 360 degrees. A moldboard 105 for an earthmoving work is fitted to a rear portion of the travel unit 102 in such a way as to be moved up and down.

An operation part 106 and the diesel engine 70 are mounted on a right side portion of the turning machine body 104. The diesel engine 70 has its top covered from above by a hood 107 and has the operation part 106 fitted on the hood 107. A canopy 140 is erected in the rear of the operation part of the hood 107. A work part 110 having a boom 111 and a bucket 113 for digging the earth is fitted on a left side portion of the turning machine body 104. A counter weight 109 to achieve a weight balance with respect to the work part 110 is fitted, as a weight balancer of the work vehicle, on a side portion (right side portion in the embodiment) opposite to the work part 110 of the turning machine body 104.

The operation part 106 is provided with an operator seat 108 on which an operator is seated, an operation means for operating the output of the diesel engine 70 and the like, and a lever or a switch as an operation means for the work part 110. The boom 111 of a constituent element of the work part 110 has a boom cylinder 112 and a bucket cylinder 114 fitted thereon. The bucket 113 as a digging attachment is fitted to a tip portion of the boom 111 so as to turn and scoop. The boom cylinder 112 or the bucket cylinder 114 is activated to perform a construction work (for example, the earthmoving work of digging a groove) by the bucket 113.

Figure 21:
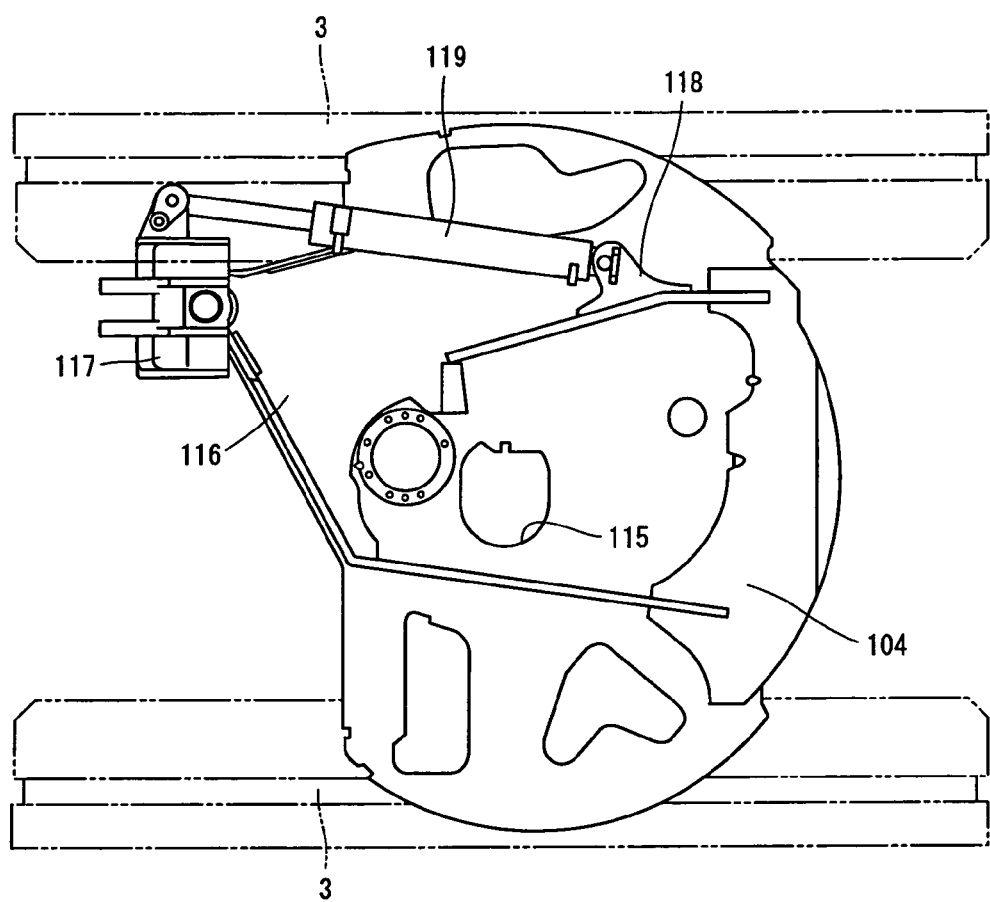
FIG. 21 is a plan view of a turning machine body.

As shown in FIG. 21, the turning machine body 104 is formed in a semi-circular shape (in the shape of a fan) when viewed in a plan view, and an opening 115, in which a bearing for turn (not shown in the drawing) provided on the travel unit 102 is fitted, is formed in a portion close to the center of the turning machine body 104. The opening 115 is the center of turn of the turning machine body 104. A bracket fitting part 116 protruding outward from the left side portion of the turning machine body 104 has a boom bracket 117 fitted thereto so as to swing horizontally, the boom bracket 117 constructing a base end portion of the boom 111. A cylinder part of a hydraulic cylinder 119 for turn is coupled to a pivot bracket 118 so as to turn horizontally, the pivot bracket 118 being fitted on the upper surface of the turning machine body 104. On the other hand, a piston rod of the hydraulic cylinder 119 for turn is coupled to the boom bracket 117 so as to turn horizontally. When the hydraulic cylinder 119 for turn is extended or contracted, the boom 111 is swung in a horizontal direction.

Figure 22:
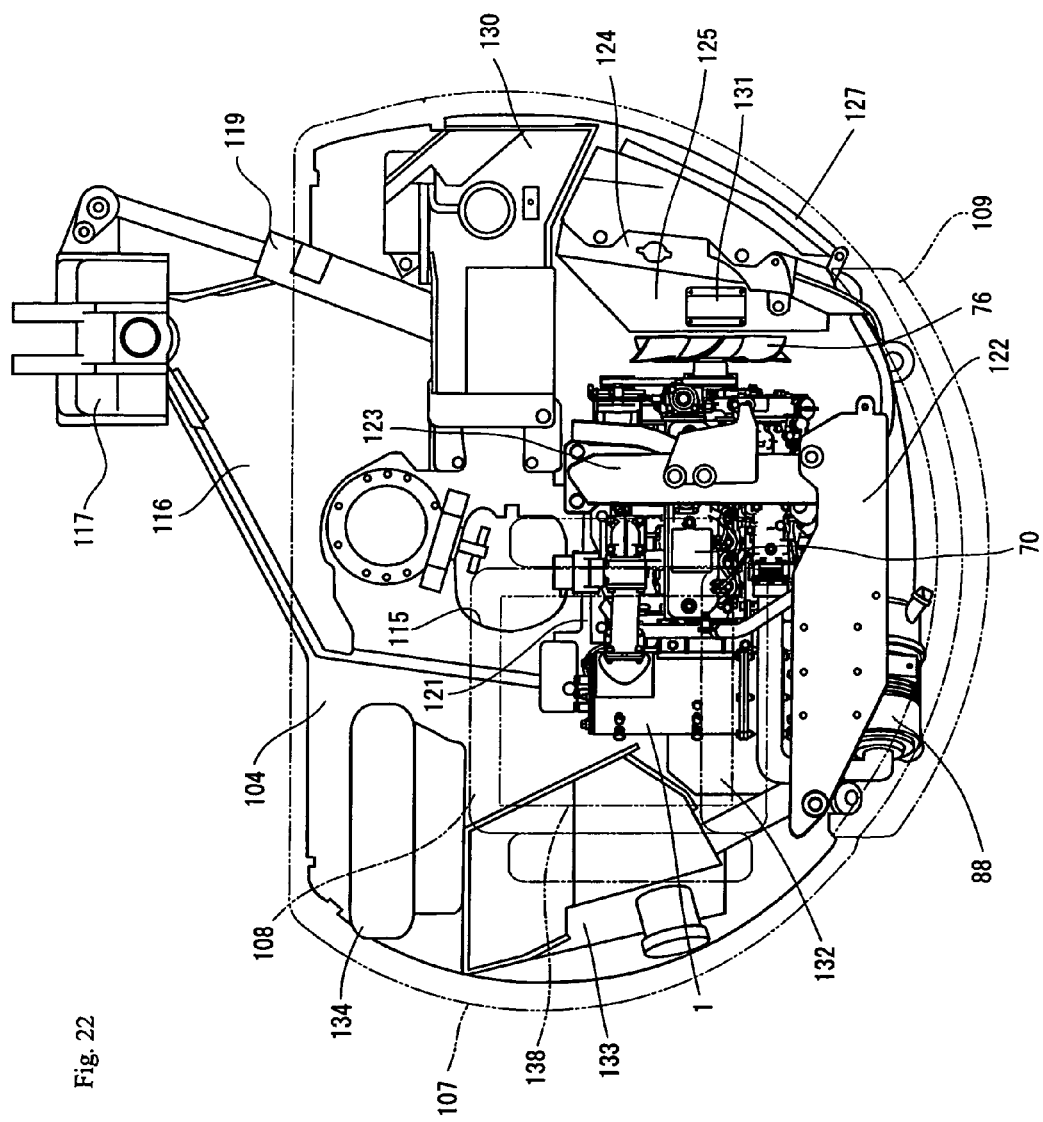
FIG. 22 is a plan view to show an arrangement configuration on the turning machine body.
Figure 23:
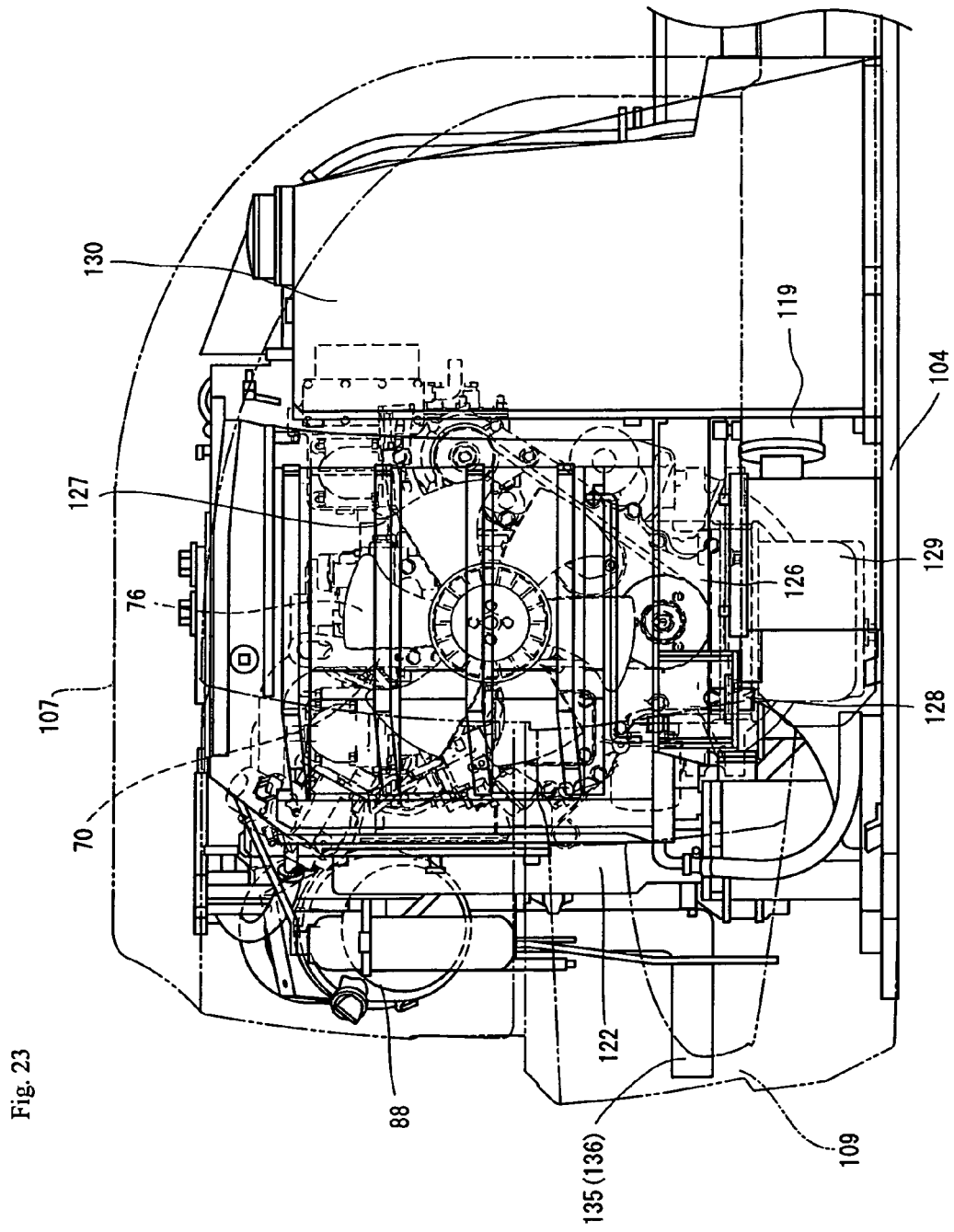
FIG. 23 is a front side view to show an arrangement configuration on the turning machine body.
Figure 24:
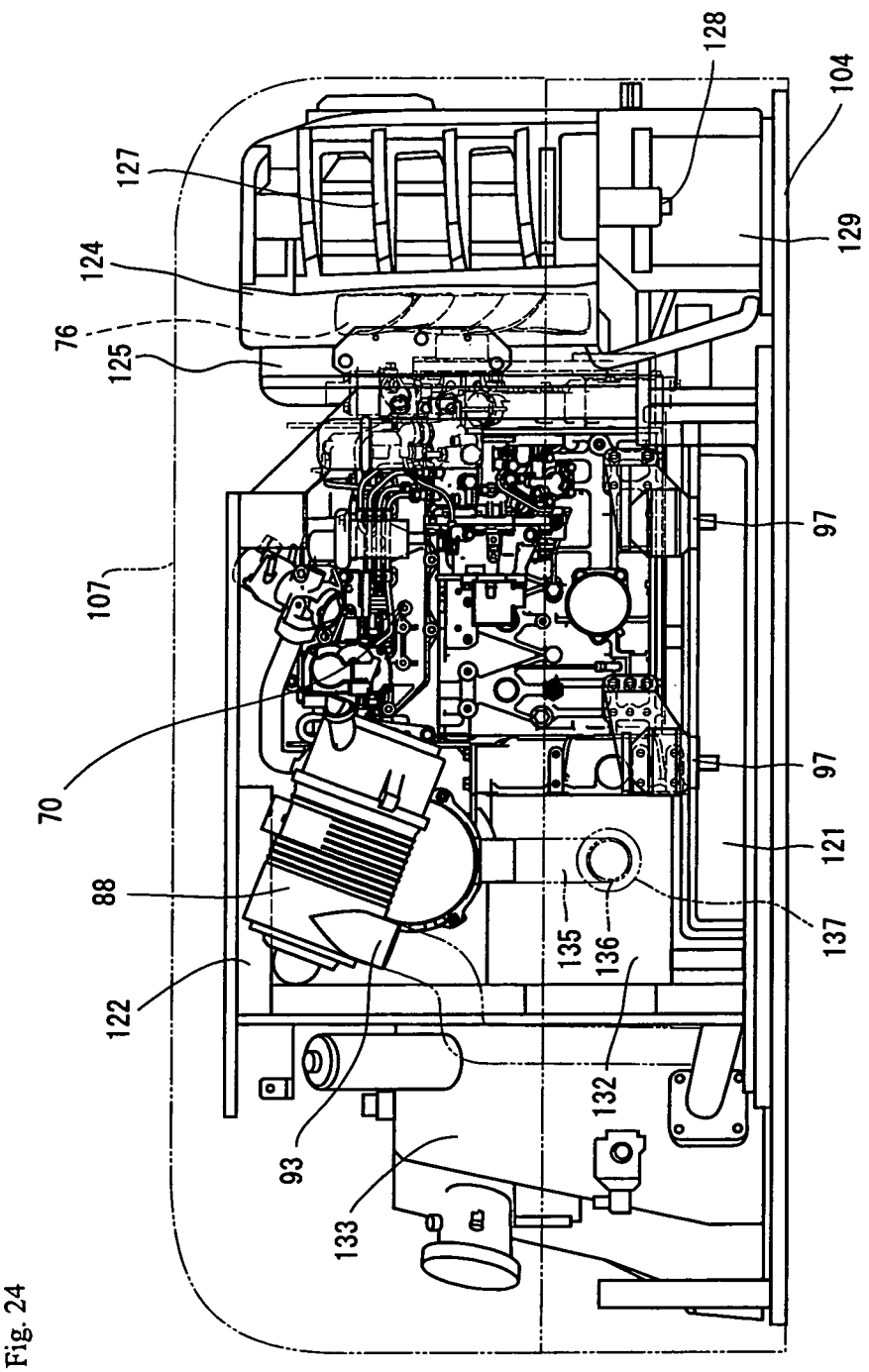
FIG. 24 is a right side view to show an arrangement configuration on the turning machine body.

Hereinafter, the respective units and members received in a space between the turning machine body 104 and the hood 107 will be described in detail. As shown in FIG. 22 to FIG. 24, an engine support chassis 121 (chassis for forming an engine room), which is formed nearly in the shape of a rectangular frame when viewed in a plan view, is fixed on the right side of the opening 115 of the turning machine body 104. A canopy fitting chassis 122 for forming an engine room shaped like a gate is erected on a right frame (frame on a counter weight 109 side) of the engine support chassis 121. The diesel engine 70 is fitted from above to the engine support chassis 121 in a vibration isolating state via the respective engine leg bodies 97. The support parts of the canopy 140 are fastened by bolts to the canopy fitting chassis 122 (chassis for forming the engine room) via the hood 107.

The diesel engine 70 of the present embodiment is arranged transversely with respect to the turning machine body 104 in such a way that the cooling fan 76 is positioned on the front side of the turning machine body 104 and that the flywheel housing 78 (by extension, the DPF 1) is positioned on the rear side of the turning machine body 104. That is, the diesel engine 70 is arranged in such a way that the engine output shaft 74 is directed to a front and rear direction perpendicular to a left and right direction in which the work part 110 and the counter weight 109 are lined up.

The upper frame of the canopy fitting chassis 122 and the left frame of the engine support chassis 121 are coupled to each other by a reinforcing member 123 which covers the upper side and the left side of the diesel engine 70 and which is shaped like an inverse letter L. Hence, the diesel engine 70 has its periphery surrounded by the engine support chassis 121 as the chassis for forming the engine room, the canopy fitting chassis 122, and the reinforcing member 123 and has the outer circumferential side of the periphery further covered with the hood 107.

An engine cooling radiator 124 and an oil cooler 125 are arranged forward of the cooling fan 76 so as to oppose to the cooling fan 76. The radiator 124 is fitted to a radiator support base 126 fixed to the engine support chassis 121. A movable louver 127 is arranged forward of the radiator 124. When the cooling fan 76 is rotated to blow cooling air to the radiator 124 and the oil cooler 125, the radiator 124 and the oil cooler 125 are cooled by the air.

As shown in FIG. 23 and FIG. 24, the radiator 124 is fitted to the radiator support base 126 and is arranged with a clearance set above the upper surface of the turning machine body 104, in other words, a space is set between the turning machine body 104 and the radiator 124. A battery 129 for supplying electric power is received in the space, that is, below the radiator 124 and on the side of a radiator drain 128. A fuel tank 130 is arranged forward of the radiator 124 and the louver 127. A controller 131 for controlling the operation of the backhoe 100 is arranged above the cooling fan 76 (in the present embodiment, on the upper surface of the oil cooler 125).

Although not shown in detail, a front portion of the hood 107 (for example, portion covering the radiator 124 and the oil cooler 125) can be also constructed as a portion separate from the other portion of the hood 107, that is, the front portion can be also constructed as an opening/closing door. According to this construction, when the opening/closing door is opened, the radiator 124, the oil cooler 125, the battery 129, and the controller 131 can be exposed to the outside and hence the maintenance work such as a cleaning work or a replacing work can be easily performed.

As described above, the flywheel housing 78 of the diesel engine 70 is positioned on the rear side of the turning machine body 104 and the DPF 1 is arranged on the flywheel housing 78. The air cleaner 88 is arranged at a position on the silencer 30 side (right side) of the DPF 1 and lower than the diesel engine 70 by a level difference H2. The air cleaner 88 is suspended by an upper frame of the canopy fitting chassis 122 via a cleaner support leg 92. In this case, the air cleaner 88 is positioned in a dead space between an upper part of an inner surface (at the upper right of) close to the counter weight 109, of the hood 107 and the DPF 1.

As shown in FIG. 24, the tail pipe 135 as an exhaust pipe extending downward is connected to the exhaust gas outlet pipe 34 protruding from the silencer 30 of the DPF 1. The exhaust port 136 of the tail pipe 135 is faced to or passed through a through hole 137 formed in the counter weight 109 on the right side portion of the turning machine body 104.

Here, of the inner face of the hood 107, a portion above the DPF 1 has a seat mount 138 (see a single dot and dash line in FIG. 22) fitted thereto, the seat mount 138 supporting the operator seat 108 in such a way that the operator seat 108 can slide back and forth. In the present embodiment, the bolts closing the sensor connection plugs 50 and the flange bodies 25, 26 of the DPF 1 and the seat mount 138 have their mutual positions set so as not to interfere with each other.

A hydraulic pump 132 driven by the power of the diesel engine 70 via the flywheel 79 is arranged near the flywheel housing 78. A reservoir tank 133 is arranged forward of the hydraulic pump 132. A control valve 134 is fitted on the left side of the reservoir tank 133. The reservoir tank 133, the hydraulic pump 132, the control valve 134, the hydraulic pump for turn, the hydraulic cylinder 119 for turn, and the respective cylinders 112, 114 of the work part 110 are connected to each other by hydraulic hoses, and the hydraulic pump 132 is driven to supply an operating oil to the respective parts from the reservoir tank 133.

As is evident from the above-mentioned construction, the backhoe 100 of the present embodiment has the air cleaner 88 and the DPF 1 fitted in the hood 107, the air cleaner 88 cleaning air introduced into the diesel engine 70, the DPF 1 cleaning the exhaust gas exhausted from the diesel engine 70. The DPF 1 is arranged on the flywheel housing 78 fitted on one side portion of the diesel engine 70. Hence, the DPF 1 can be highly rigidly arranged as one constituent parts of the diesel engine 70 in the diesel engine 70.

In other words, the DPF 1 can be supported highly rigidly by the use of the flywheel housing 78 of a highly rigid part of the diesel engine 70 to prevent the DPF 1 from being damaged by vibration or the like. Further, the diesel engine 70 can be shipped in a state where the DPF 1 is fitted in the diesel engine 70 at the manufacturing place of the diesel engine 70, so that the diesel engine 70 and the DPF 1 can be constructed together in a compact size.

Further, the diesel engine 70 can be shipped in a state where the DPF 1 is fitted in the diesel engine 70, so that even when the diesel engine 70 is mounted in a vehicle other than the backhoe 100, it is possible to save the manpower and time of applying for shipment for each vehicle and hence to reduce manufacturing cost. Further, the DPF 1 can be made to communicate with the exhaust manifold 71 at an extremely close range. Hence, this makes it possible to keep the DPF 1 at a proper temperature and to keep a high performance of cleaning the exhaust gas, and in addition, to contribute also to the downsizing of the DPF 1.

In addition, the air cleaner 88 is arranged on the side of the DPF 1 at a position lower than the upper end of the diesel engine 70, so that the DPF 1 and the air cleaner 88 can be compactly arranged between the inner surface of the hood 107 and the diesel engine 70 by the effective use of a peripheral space of the diesel engine 70. Further, the DPF 1 heavier than the air cleaner 88 is arranged at a position lower than the air cleaner 88, so that the center of gravity of the diesel engine 70 can be lowered and hence vibration isolation can be enhanced. Still further, this arrangement of the DPF 1 and the air cleaner 88 can produce also an advantage of heating the air cleaner 88 easily by the exhaust heat from the DPF 1 arranged close to the air cleaner 88.

In the present embodiment, a filter support body (support leg body 19) is fitted on the upper portion of the flywheel housing 78 and the DPF 1 is coupled to the exhaust manifold 71 of the diesel engine 70 and is coupled to the flywheel housing 78 via the filter support body (support leg body 19), so that the DPF 1 can be highly rigidly coupled to the top of the flywheel housing 78 by the support using the rigid bodies of the exhaust manifold 71 and the filter support body (support leg body 19). This can have a large effect on preventing the DPF 1 from being damaged by vibrations or the like.

Further, as shown in FIG. 15 to FIG. 18 and FIG. 22 to FIG. 24, the DPF 1 and the air cleaner 88 are arranged separately from the upper surface of the diesel engine 70, so that the upper surface sides of the cylinder head 72, the exhaust manifold 71, and the intake manifold 73 can be exposed to the outside and hence the maintenance work related to the diesel engine 70 can be easily performed. Moreover, the air cleaner 88 is positioned between an upper part of the inner surface close to the counter weight 109, of the hood 107, and the DPF 1, so that the DPF 1 and the air cleaner 88 can be fitted close to each other by the effective use of a dead space of a corner portion which is the upper part of the inner surface close to the counter weight 109, of the hood 107 without enlarging the size of the hood 107.

As shown in FIG. 15 to FIG. 18 and FIG. 22 to FIG. 24, the DPF 1 is arranged opposite to one side surface of the cylinder head 72 positioned at the upper portion of the diesel engine 70, so that the DPF 1 is hidden behind the cylinder head 72 on the leeward of the cooling fan 76 of the diesel engine 70. Hence, this arrangement can prevent the air from the cooling fan 76 from directly blowing on the DPF 1 to prevent the temperature of the DPF 1, by extension, the temperature of the exhaust gas in the DPF 1 from being lowered by the air from the cooling fan 76, which results in keeping the temperature of the exhaust gas.

As shown in FIG. 23 and FIG. 24, the engine cooling radiator 124 is arranged opposite to the cooling fan 76 in the hood 107, and the battery 129 for supplying electric power is arranged below the radiator 124 and on the side of the radiator drain 128, so that a space between the turning machine body 104 and the radiator 124 can be effectively utilized as a space for arranging the battery 129, which can increase the efficiency of utilizing the interior space of the hood 107.

On the other hand, the controller 131 for controlling the operation of the backhoe 100 is arranged above the cooling fan 76 (in the present embodiment, on the upper surface of the oil cooler 125). Hence, this arrangement can prevent the exhaust heat from the DPF 1 from affecting the controller 131 susceptible to heat and can contribute to the stabilization of the control by the controller 131 and to the elongation of the life of the controller 131.

As shown in FIG. 15 to FIG. 18 and FIG. 22 to FIG. 24, the DPF 1 and the air cleaner 88 have their upper ends set at positions lower than the upper end of the diesel engine 70, so that the effect of the DPF 1 and the air cleaner 88 on the total height of the diesel engine 70 can be eliminated. Hence, even if the diesel engine 70 has the DPF 1 and the air cleaner 88 fitted therein, the diesel engine 70 can be constructed so as to decrease the total height as much as possible. Of course, this arrangement also can produce an advantage of more surely preventing air from the cooling fan 76 from directly blowing on the DPF 1.

As shown in FIG. 24, the counter weight 109 to achieve a weight balance with respect to the work part 110 is fitted to the side portion opposite to the work part 110 (in the present embodiment, right side portion) of the turning machine body 104. The exhaust gas outlet pipe 34 protruding from the silencer 30 of the DPF 1 is positioned close to the counter weight 109. The exhaust port 136 of the tail pipe 135 connected to the exhaust gas outlet pipe 34 and extended downward is faced to or passed through the through hole 137 formed in the counter weight 109. Hence, the exhaust gas outlet pipe 34 of the DPF 1 can be made to communicate with the through hole 137 of the counter weight 109 at an extremely close range. This can shorten the length of the tail pipe 135 and hence can produce an advantage of easily fitting the tail pipe 135.

In this regard, the invention in the application is not limited to the above-mentioned embodiment but can be modified in various modes. For example, the invention in the application is not applied only to the backhoe 100 described above but also can be widely applied to various work vehicles like an agricultural vehicle such as a tractor and a special work vehicle such as a crane vehicle. Moreover, the constructions of the respective parts in the invention in the application are not limited to the embodiment shown in the drawings but can be variously modified within a range not departing from the gist of the invention in the application.

REFERENCE NUMERALS

1 DPF (diesel particulate filter, exhaust gas cleaning device)
16 exhaust gas inlet pipe (exhaust gas inlet of DPF)
19 support leg body (filter support body)
34 exhaust gas outlet pipe (exhaust gas outlet of DPF)
70 diesel engine
71 exhaust manifold
76 cooling fan
78 flywheel housing
88 air cleaner
109 counter weight
121 engine support chassis (chassis for forming engine room)
122 canopy fitting chassis (chassis for forming engine room)
124 radiator
128 radiator drain
129 battery
131 controller
135 tail pipe (exhaust gas pipe)
137 through hole

The invention claimed is:

1. A work vehicle-mounted engine device comprising:
an engine mounted on a machine body and covered with a hood;
an air cleaner for cleaning air introduced into the engine; and
an exhaust gas cleaning device for cleaning exhaust gas from an exhaust manifold of the engine; and
wherein a cooling fan is arranged on one side portion of the engine;
wherein a flywheel housing is fitted to an other side portion of the engine opposite to the one side portion where the cooling fan is arranged;
wherein a support body is fitted on an upper portion of the flywheel housing;
wherein the exhaust gas cleaning device is fitted on the flywheel housing via the support body;
wherein a filter support body is provided on an outer peripheral side of the exhaust gas cleaning device so as to support the exhaust gas cleaning device, and an inlet tube is provided on the outer peripheral side of the exhaust gas cleaning device and connected so as to communicate with the exhaust manifold;
wherein the filter support body is affixed to an upper surface of the flywheel housing so as to position the exhaust gas cleaning device in a long position in a direction perpendicular to an output shaft of the engine; and
wherein the exhaust gas cleaning device comprises: a first gas cleaning filter contained in a first inner case; a second gas cleaning filter contained in a second inner case, the first and second gas cleaning filters for cleaning the exhaust gas and being of different types; and a first outer case and second outer case together containing the first and second inner cases, in which the first outer case contains the first the inner case and together with the second outer case contains the second inner case.

2. The work vehicle-mounted engine device as claimed in claim 1, wherein the exhaust gas cleaning device is arranged close to a cylinder head of the engine.

3. The work vehicle-mounted engine device as claimed in claim 1, wherein:
the air cleaner is arranged at a position lower than an upper surface of the engine and on one side of the engine; and
the exhaust gas cleaning device is arranged on an other side of the engine.

4. The work vehicle-mounted engine device as claimed in claim 1, wherein a structure in which the engine and a counter weight to achieve a weight balance of a work vehicle are arranged on a turning machine body rotatable around a vertical axis and in which an exhaust gas pipe is made to communicate with the exhaust gas cleaning device, and an exhaust outlet side of the exhaust gas pipe is faced to a through hole formed in the counter weight.

5. The work vehicle-mounted engine device as claimed in claim 1, wherein a structure in which the engine and a counter weight as a weight balancer of a work vehicle are arranged on a turning machine body rotatable around a vertical axis and in which an exhaust gas pipe is made to communicate with the exhaust gas cleaning device, and an exhaust port side of the exhaust gas pipe is passed through a through hole formed in the counter weight.

6. The work vehicle-mounted engine device as claimed in claim 1, wherein a work vehicle structure in which a chassis for forming an engine room is fitted in the hood and in which an outer peripheral side of the engine is surrounded by the chassis for forming an engine room, and the air cleaner and the exhaust gas cleaning device are arranged in an engine room space surrounded by the chassis at positions separate from an upper surface of the engine.

7. The work vehicle-mounted engine device as claimed in claim 1, wherein a battery for supplying electric power is arranged below an engine cooling radiator and on a side of a radiator drain, the engine cooling radiator being arranged opposite to the cooling fan in the hood.

8. The work vehicle-mounted engine device as claimed in claim 1, wherein a controller for controlling an operation of a turning work vehicle is arranged in the hood and above the cooling fan.

* * * * *